(12) United States Patent
Barton-Sweeney et al.

(10) Patent No.: US 12,447,961 B2
(45) Date of Patent: Oct. 21, 2025

(54) METHODS AND SYSTEMS FOR ADJUSTING VEHICLE BEHAVIOR BASED ON AMBIENT GROUND RELATIVE WIND SPEED ESTIMATIONS

(71) Applicant: Waymo LLC, Mountain View, CA (US)

(72) Inventors: Andrew Barton-Sweeney, Oakland, CA (US); Andre Strobel, Mountain View, CA (US); Mark Calleija, Mountain View, CA (US); Joel Benito Manrique, Altadena, CA (US)

(73) Assignee: Waymo LLC, Mountain View, CA (US)

( * ) Notice: Subject to any disclaimer, the term of this patent is extended or adjusted under 35 U.S.C. 154(b) by 149 days.

(21) Appl. No.: 17/810,959

(22) Filed: Jul. 6, 2022

(65) Prior Publication Data

US 2024/0010198 A1    Jan. 11, 2024

(51) Int. Cl.
*B60W 30/14*        (2006.01)
*B60W 40/02*        (2006.01)
(Continued)

(52) U.S. Cl.
CPC .......... *B60W 30/146* (2013.01); *B60W 40/02* (2013.01); *B60W 40/105* (2013.01);
(Continued)

(58) Field of Classification Search
CPC ............................ B60W 30/146; B60W 40/02
See application file for complete search history.

(56) References Cited

U.S. PATENT DOCUMENTS 8,655,559 B2    2/2014  Peake
9,522,379 B2   12/2016  McAlister
(Continued)

FOREIGN PATENT DOCUMENTS

CN        112428981 A       5/2022

OTHER PUBLICATIONS

Alrejjal et al., "Impact of Crosswinds and truck weight on rollover propensity when negotiating combined curves", International Journal of Transportation Science and Technology (2022).

*Primary Examiner* — Imran K Mustafa
(74) *Attorney, Agent, or Firm* — McDonnell Boehnen Hulbert & Berghoff LLP

(57) ABSTRACT

Example embodiments relate to techniques for adjusting vehicle behavior based on ambient ground relative wind estimations. An onboard computing system may receive wind data from one or multiple wind sensors positioned onboard a vehicle. The wind data can indicate a direction and a speed of wind propagating in the vehicle's environment. The computing system can also receive navigation data that represents a direction and a speed of the vehicle and then estimate an ambient ground relative wind speed based on the navigation data and the wind data. The computing system can adjust the behavior of the vehicle based on the ambient ground relative wind speed. For instance, the computing system may compare the speed of the ambient ground relative wind to a predefined behavior threshold curve and adjust the behavior of the vehicle based on the comparison.

20 Claims, 14 Drawing Sheets

(51) Int. Cl.
- *B60W 40/105* (2012.01)
- *B60W 40/13* (2012.01)
- *B60W 50/00* (2006.01)
- *B60W 60/00* (2020.01)
- *G01W 1/10* (2006.01)

(52) U.S. Cl.
CPC ........ *B60W 40/13* (2013.01); *B60W 50/0097* (2013.01); *B60W 60/0015* (2020.02); *G01W 1/10* (2013.01); *B60W 2050/0052* (2013.01); *B60W 2300/145* (2013.01); *B60W 2420/408* (2024.01); *B60W 2422/00* (2013.01); *B60W 2520/06* (2013.01); *B60W 2520/10* (2013.01); *B60W 2555/20* (2020.02); *B60W 2556/40* (2020.02); *B60W 2556/50* (2020.02); *G01W 2203/00* (2013.01)

(56) References Cited

U.S. PATENT DOCUMENTS

| | | |
|---|---|---|
| 10,228,696 B2 | 3/2019 | Myers |
| 11,628,863 B1* | 4/2023 | Huang .............. B60W 60/0023 701/24 |
| 2018/0210447 A1* | 7/2018 | Myers .............. G08G 1/096855 |
| 2019/0258251 A1* | 8/2019 | Ditty .................... G05D 1/0274 |
| 2020/0057453 A1 | 2/2020 | Laws |
| 2022/0097713 A1* | 3/2022 | Neubecker ............ B60W 40/02 |
| 2022/0126867 A1* | 4/2022 | Han .......................... G01P 5/00 |
| 2022/0291377 A1* | 9/2022 | Medinei ................. G01S 15/42 |

\* cited by examiner

METHODS AND SYSTEMS FOR ADJUSTING VEHICLE BEHAVIOR BASED ON AMBIENT GROUND RELATIVE WIND SPEED ESTIMATIONS

BACKGROUND

Advancements in computing, sensors, and other technologies have enabled vehicles to safely navigate between locations autonomously, i.e., without requiring input from a human driver. By processing sensor measurements of the surrounding environment in real-time, an autonomous vehicle can safely transport passengers or objects (e.g., cargo) between locations while avoiding obstacles, obeying traffic requirements, and performing other actions that are typically conducted by a driver. Shifting both decision-making and control of the vehicle over to vehicle systems can allow any passengers to devote their attention to tasks other than driving while real-time adjustments can be made to the operation of the autonomous vehicle based on incoming sensor data.

SUMMARY

Example embodiments relate to adjusting vehicle behavior based on ambient ground relative wind estimations. Wind data captured by onboard wind sensors can provide real-time measurements about environmental wind conditions that can be used by vehicle systems to estimate an ambient ground relative wind speed. In some cases, vehicle systems may adjust vehicle behavior based on estimated ambient ground relative wind speed to minimize the impact of windy conditions. For instance, the vehicle systems may use one or multiple threshold curves to adjust vehicle behavior according to the estimated speed of the ambient ground relative wind.

Accordingly, a first example embodiment describes a method. The method involves receiving, at a computing device coupled to a vehicle, wind data from a wind sensor coupled to the vehicle. The wind data represents a direction and a speed of air propagating in an environment of the vehicle. The method also involves receiving, at the computing device, navigation data from a vehicle sensor coupled to the vehicle. The navigation data represents a direction and a speed of the vehicle. The method further involves, based on the navigation data and the wind data, estimating an ambient ground relative wind speed and adjusting behavior of the vehicle based on the ambient ground relative wind speed.

Another example embodiment describes a system. The system includes a vehicle and a computing device. The computing device is configured to receive wind data from a wind sensor coupled to the vehicle. The wind data represents a direction and a speed of air propagating in an environment of the vehicle. The computing device is also configured to receive navigation data from a vehicle sensor coupled to the vehicle. The navigation data represents a direction and a speed of the vehicle. The computing device is further configured to, based on the navigation data and the wind data, estimate an ambient ground relative wind speed and adjust behavior of the vehicle based on the ambient ground relative wind speed.

An additional example embodiment describes a non-transitory computer-readable medium configured to store instructions, that when executed by a computing device, causes the computing device to perform operations. The operations involve receiving wind data from a wind sensor coupled to a vehicle. The wind data represents a direction and a speed of air propagating in an environment of the vehicle. The operations further involve receiving navigation data from a vehicle sensor coupled to the vehicle, where the navigation data represents a direction and a speed of the vehicle. The operations also involve estimating an ambient ground relative wind speed based on the navigation data and the wind data and adjusting behavior of the vehicle based on the ambient ground relative wind speed.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1:
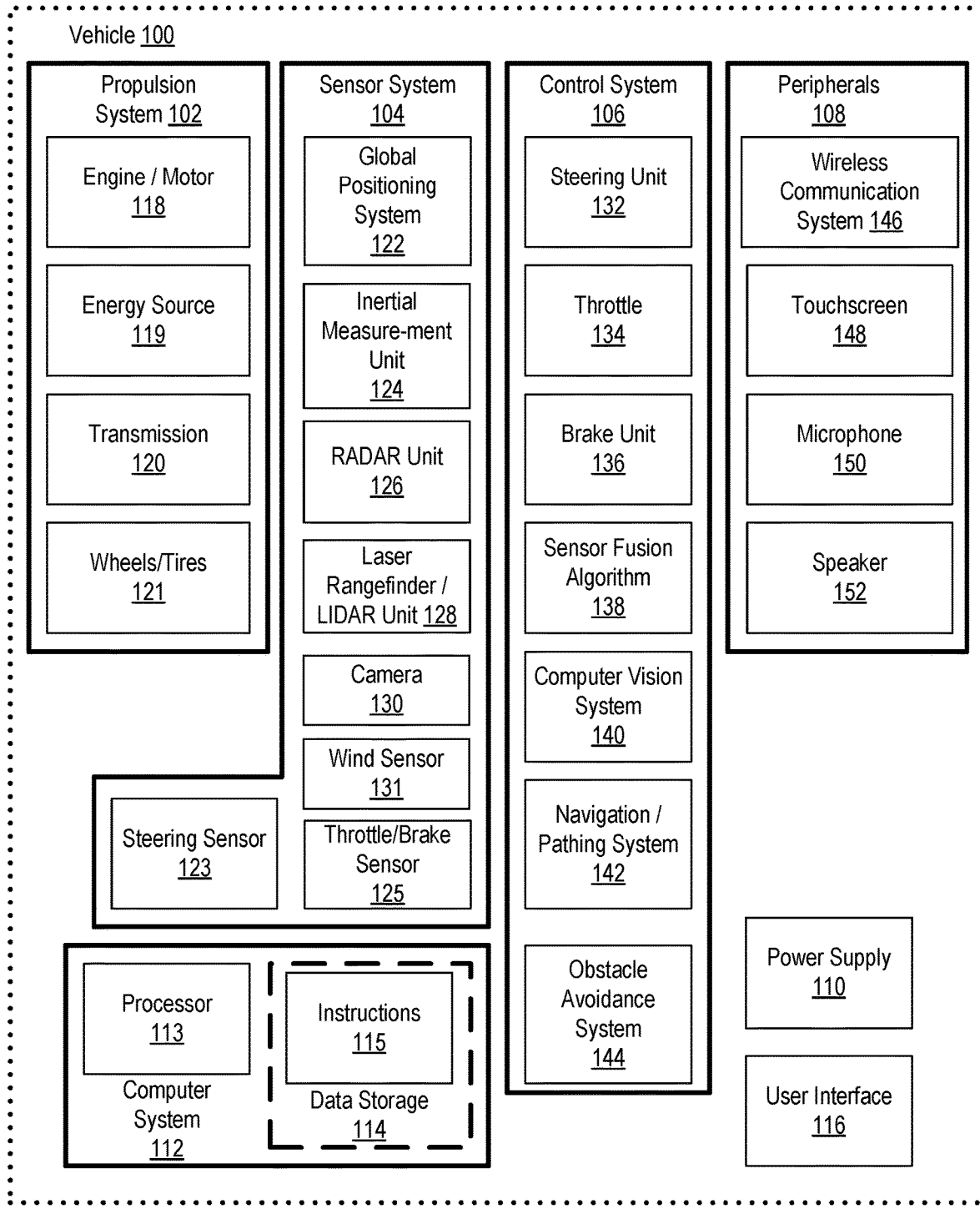
FIG. 1 is a functional block diagram illustrating a vehicle, according to one or more example embodiments.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Strong winds can impact the roll and off tracking stability of vehicles, especially semi-trucks pulling trailers. The impact of wind gusts can be increased due to the large sail areas of the trailer and the body of a semi-truck. During windy conditions, a driver typically uses a combination of vision, sound, steering feedback and inertia to estimate the wind-induced disturbances and adjust controls as needed to avoid excessive roll or off tracking. In some cases, the driver might determine that strong wind conditions warrant slowing down or even pulling over to the side of the road for a temporary period until environment conditions improve. As such, these wind estimation and control adjustment techniques that are typically performed by a driver can be difficult for a robotic system to duplicate. The robotic system may encounter problems due to mixed, complex noise, and nonlinear properties of the various signals analyzed by the driver to understand and react to windy conditions.

Example embodiments relate to techniques for adjusting vehicle behavior based on ambient ground relative wind estimations. Trucks and other types of vehicles may perform disclosed techniques when operating autonomously or semi-autonomously to overcome challenges that might arise due to windy conditions experienced during navigation of a route. Such techniques can be performed in real-time as the vehicle navigates to adjust vehicle behavior according to dynamic environment conditions. For instance, an autonomous truck may use disclosed techniques to automatically adjust navigation behavior in response to detected changes in the ambient ground relative wind speed as the truck transitions from traveling within a tunnel and into an open-air environment. In some embodiments, disclosed techniques can be used to assist a driver of a truck or another type of vehicle. Vehicle systems may detect changes in the speed of ambient ground relative wind that may impact vehicle navigation and provide alerts and/or other assistance to the driver.

Disclosed techniques can enable hyper localized measurements from one or multiple onboard wind sensors that provide real-time environment information about what the vehicle is experiencing during navigation. While remote observations and forecasts can provide large scale information, an autonomous vehicle can use the localized measurements to adjust vehicle behavior in real-time. As an example result, disclosed techniques can provide localized ambient wind measurements that factor the impacts of micro level terrain, canyoning or structures (e.g., tunnels or buildings). In addition, some examples involve determining the ambient crosswind speed and adjusting vehicle behavior based on the crosswind speed. For instance, the ambient crosswind can be determined relative to the vehicle based on the crosswind component of the wind speed and direction measurements from an onboard wind sensor.

By way of an example, an autonomous truck may obtain and use real-time air speed measurements from one or multiple onboard wind sensors along with the truck's current trajectory (e.g., speed and heading of the truck) to estimate an ambient ground relative wind speed. The estimated ambient ground relative wind speed may represent the environmental air flow relative to the ground and can differ from localized air disturbances that frequently occur around specific regions of the vehicle. The ambient ground relative wind speed differs from the air speed measured by a wind sensor because the air speed measured by the wind sensor is mixed with the velocity that the wind sensor is traveling. With the wind sensor positioned on a vehicle, the speed and direction of the vehicle impacts the air speed measurements obtained by the wind sensor. As such, the air speed measured by the wind sensor and the velocity of the wind sensor due to the vehicle's velocity during navigation can be used to extract information representing the ambient ground relative wind speed. Disclosed techniques can unmix the mixed air speed data to provide information about the ambient wind speed relative to the ground.

The estimated ambient ground relative wind speed may then be used by vehicle systems to determine behavior adjustments that can minimize the impact of wind during navigation. For instance, vehicle systems may adjust the speed, route, following distance relative to lead vehicles, braking parameters, and/or other navigation parameters based on the estimated speed (and potentially direction) of the ambient ground relative wind.

Vehicle systems may also communicate estimated speeds of ambient ground relative wind and other information (e.g., location) to other vehicles and/or a remote computing system. Other vehicles may use the information to make adjustments in real-time. For instance, a lead vehicle can convey the information to other vehicles traveling behind in a convoy formation. In some instances, a vehicle may alert one or multiple vehicles traveling in opposite directions about conditions experienced during navigation in the areas that the one or multiple vehicles are about to experience. For example, vehicles can communicate weather conditions and recently estimated ambient ground relative wind speeds and directions associated with map data. This way, vehicles can adjust operations based on additional information received from other vehicles.

Similarly, the remote computing system may compile map data that indicates measured speed and direction of ambient ground relative winds that can be distributed and used by vehicles for route planning and control strategies. In some embodiments, vehicle systems can factor remote forecasts in addition to disclosed techniques. Vehicle behavior can be modified in advance based on a combination of local ambient wind estimation and the remote forecasts.

In some embodiments, estimation of the ambient ground relative wind speed can involve adding the speed and direction of the vehicle (i.e., the vehicle's trajectory) to the apparent air speed and direction measured by one or multiple onboard wind sensors. For instance, an onboard computing system may periodically or continuously use measured wind data and the vehicle's trajectory to determine and update the speed and direction of the ambient ground relative wind in the vehicle's environment. As such, the resulting direction and speed of the estimated ambient ground relative wind can then be conveyed as an ambient wind vector that represents both the ambient wind speed and direction relative to the vehicle's trajectory. In particular, the ambient wind vector can be generated by adding the sensor velocity vector (derived from the vehicle's velocity vector) to the apparent air speed and direction vector derived from wind measurements. Vehicle systems can then adjust vehicle behavior in real-time based on the ambient ground relative wind vector. As an example result, vehicle systems can change vehicle behavior as the vehicle navigates through dynamic environments, such as paths through large buildings, through tunnels, and other scenarios where ground relative wind may change quickly.

In some examples, an onboard computing system may compare the ambient ground relative wind vector to one or more behavior threshold curves. A behavior threshold curve can be predefined and may specify one or multiple navigation parameters for the vehicle to implement based on the estimated speed and/or direction of the ambient wind vector. For instance, one or multiple behavior threshold curves can specify actions for slowing down, modifying steering, and/or other adjustments (e.g., pulling over) based on the ambient ground relative wind vector exceeding or approaching one or more thresholds or values specified within the behavior threshold curve(s). In some cases, modifying vehicle behavior may include different actions, such as stopping, slowing, pulling over, changing route, and/or resuming navigation. In addition, vehicle systems may also use behavior threshold curves when recommending actions for a driver to implement during assisted navigation.

Each behavior threshold curve may depend on various factors within example embodiments. For instance, a behavior threshold curve may depend on the vehicle configuration, type, weight, center of gravity, height, payload (height, center of gravity of the payload, type of payload), tire type and age, and/or other vehicle parameters. As an example, a prior slow down behavior threshold curve may articulate decreasing vehicle speeds that vary across ambient wind speeds, which may depend on a weight of the vehicle, a weight of the trailer, a center of gravity of the payload, and the relative static or dynamic wheel load imbalance between the left and right sides of the vehicle. The slow down effect specified by the prior slow down behavior threshold curve may be continuously increased in magnitude as the estimated ambient wind speed approaches a prior pullover or stopping threshold curve.

In some cases, after the vehicle has pulled over or stopped, the onboard wind sensors may be automatically positioned and used to verify the wind has reduced below a safe threshold. For instance, a prior resumption threshold curve can be used to determine when the vehicle should resume navigation. The resumption threshold curve may incorporate a buffer to introduce hysteresis against the prior pullover or stopping threshold curve to avoid unnecessarily frequent stops and starts. In some examples, behavior threshold curves used by vehicle systems can depend on additional environmental factors, such as weather conditions, slope of the road, traffic conditions, and/or availability of alternative routes, among others.

A wind sensor or multiple wind sensors can be coupled to the vehicle at various locations within examples. For instance, wind sensors can be positioned on a semi-truck tractor at different positions, such as on the hood, mirrors, sensor pods, bonnet, wing mirrors, bumper, or anywhere else on the tractor or trailer. The location(s) for wind sensors may be selected based on weighing the sensor or sensors' ability to obtain accurate wind measurements while also minimizing impact on the performance of other vehicle sensors and navigation of the vehicle in general.

Some example embodiments may involve using wind sensors coupled to a vehicle at a fixed orientation and position. For instance, wind sensors can be positioned on exterior surfaces on the vehicle, coupled as part of a sensor module or sensor stack with one or more vehicle sensors, located on mirrors, hoods, trailer, or other portions. In some cases, the positions of wind sensors can also depend on regulatory rules or other restrictions. Wind sensors can also be coupled via mechanics that allow adjusting the position and/or orientation of the wind sensors relative to the vehicle. In some examples, one or multiple wind sensors can be located at a threshold height above the ground, which may enable these sensors to capture measurements of unperturbed wind conditions in the environment. In addition, one or more wind sensors can be positioned inside the tractor or under the tractor, or encased within airflow channels. In addition, wind sensors can be positioned above the roof or top of the tractor and/or integrated within or in place of the wing mirrors on the tractor.

In some examples, wind sensors can be positioned high above the very front of the tractor and mounted on a single unicorn or dual bull-horn style booms from the tractor top hood. At this location and height above the ground, the wind sensor or wind sensors can avoid obstructing the field of view of autonomous vehicle sensors while also having positions that enable the sensors to capture fairly undisturbed wind measurements when the vehicle is moving at higher speeds. In some cases with dual wind sensors, the wind sensors may be positioned at the outermost position available based on lane width or legal regulations, which may be flushed with the tractor, cabin, trailer, mirrors, or other out limits of the vehicle. In some examples, wind tunnel tests and other simulations may be used to determine a position for each wind sensor on the vehicle.

In some example embodiments, a vehicle performing disclosed techniques may be a Class 8 truck (of a gross vehicle weight rating (GVWR) over 33,000 lbs.), including, for example, tractor trailer trucks, single-unit dump trucks, as well as non-commercial chassis fire trucks. Such vehicles may generally have three or more axles. In other examples, passenger vehicles, buses, and other types of vehicles may perform disclosed techniques.

Referring now to the figures, FIG. 1 is a functional block diagram illustrating example vehicle 100, which may be configured to operate fully or partially in an autonomous mode. More specifically, vehicle 100 may operate in an autonomous mode without human interaction (or reduced human interaction) through receiving control instructions from a computing system (e.g., a vehicle control system). As part of operating in the autonomous mode, vehicle 100 may use sensors to detect and possibly identify objects of the surrounding environment in order to enable safe navigation. In some implementations, vehicle 100 may also include subsystems that enable a driver (or a remote operator) to control operations of vehicle 100.

As shown in FIG. 1, vehicle 100 includes various subsystems, such as propulsion system 102, sensor system 104, control system 106, one or more peripherals 108, power supply 110, computer system 112, data storage 114, and user interface 116. In other examples, vehicle 100 may include more or fewer subsystems. The subsystems and components of vehicle 100 may be interconnected in various ways (e.g., wired or wireless connections). In addition, functions of vehicle 100 described herein can be divided into additional functional or physical components, or combined into fewer functional or physical components within implementations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Sterling engine, among other possible options. For instance, in some implementations, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some implementations, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example implementations. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as Global Positioning System (GPS) 122, inertial measurement unit (IMU) 124, radar unit 126, laser rangefinder/lidar unit 128, camera 130, wind sensor 131, steering sensor 123, and throttle/brake sensor 125, among other possible sensors. In some implementations, sensor system 104 may also include sensors configured to monitor internal systems of the vehicle 100 (e.g., 02 monitors, fuel gauge, engine oil temperature, condition of brakes).

GPS 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar unit 126 may represent one or more systems configured to use radio signals to sense objects, including the speed and heading of the objects, within the local environment of vehicle 100. As such, radar unit 126 may include antennas configured to transmit and receive radar signals as discussed above. In some implementations, radar unit 126 may correspond to a mountable radar system configured to obtain measurements of the surrounding environment of vehicle 100. For example, radar unit 126 can include one or more radar units configured to couple to the underbody of a vehicle.

Laser rangefinder/lidar 128 may include one or more laser sources, a laser scanner, and one or more detectors, among other system components, and may operate in a coherent mode (e.g., using heterodyne detection) or in an incoherent detection mode. Camera 130 may include one or more devices (e.g., still camera or video camera) configured to capture images of the environment of vehicle 100. Wind sensor 131 can be positioned onboard vehicle 100 and can provide air speed measurements. In some cases, wind sensor 131 can provide direction data about air propagating in the environment. Wind sensor 131 can include multiple wind sensors in some example embodiments.

Steering sensor 123 may sense a steering angle of vehicle 100, which may involve measuring an angle of the steering wheel or measuring an electrical signal representative of the angle of the steering wheel. In some implementations, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some implementations, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some implementations, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., stop lights, road way boundaries, etc.), and obstacles. As such, computer vision system 140 may use object recognition, Structure from Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as CDMA, EVDO, GSM/GPRS, or 4G cellular communications, such as WiMAX or LTE. Alternatively, wireless communication system 146 may communicate with a wireless local area network (WLAN) using WiFi or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some implementations. For instance, power supply 110 may include one or more batteries configured to provide electrical power. Vehicle 100 may also use other types of power supplies. In an example implementation, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory computer readable medium, such as data storage 114. In some implementations, computer system 112 may represent a plurality of computing devices that may serve to control individual components or subsystems of vehicle 100 in a distributed fashion.

In some implementations, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS 122 and the features recognized by computer vision system 140 may be used with map data stored in data storage 114 to determine specific road parameters. Further, radar unit 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100, i.e., wireless communication system 146, computer system 112, data storage 114, and user interface 116, as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

Figure 2A:
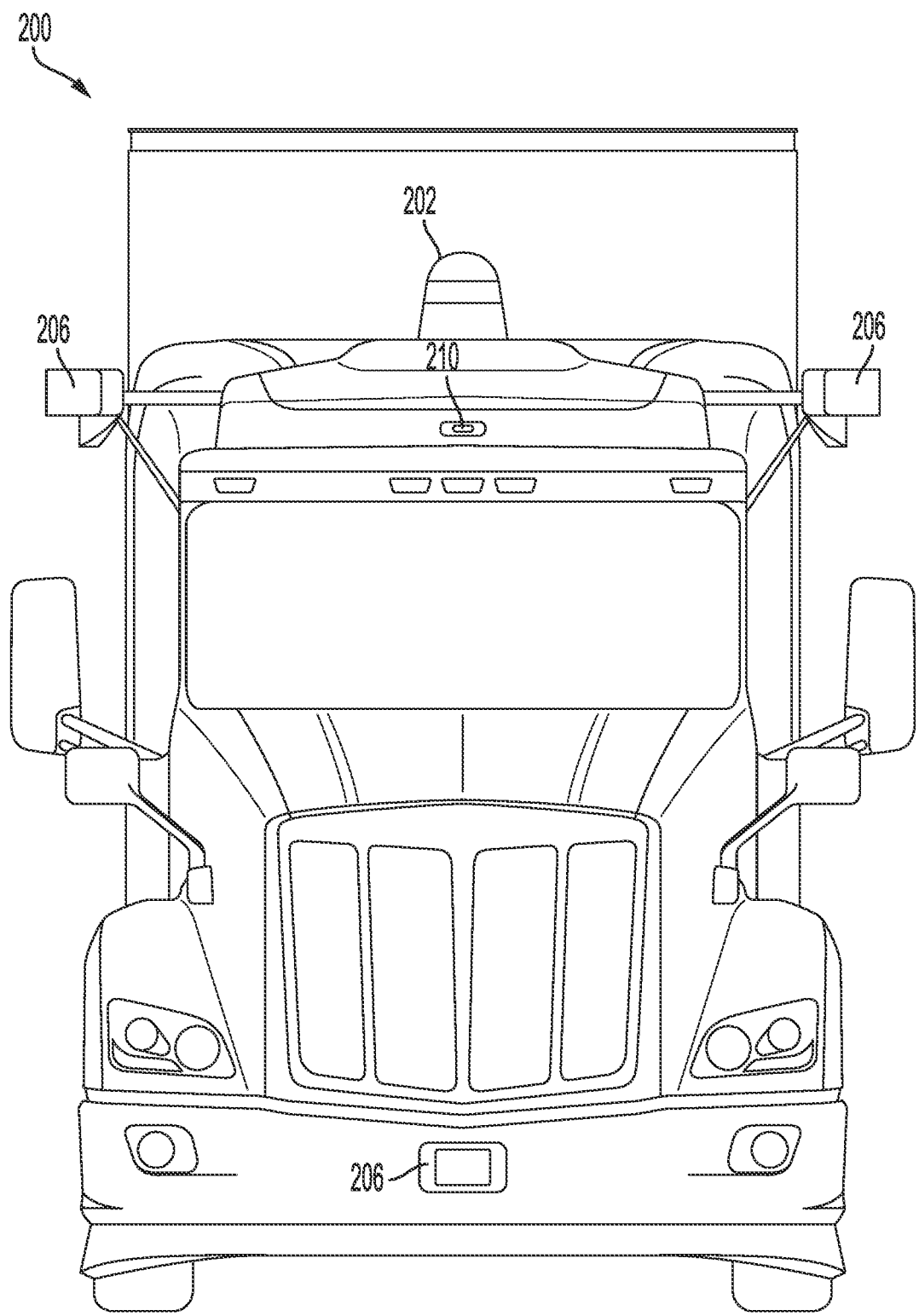
FIG. 2A illustrates a front view of a vehicle, according to one or more example embodiments.
Figure 2B:
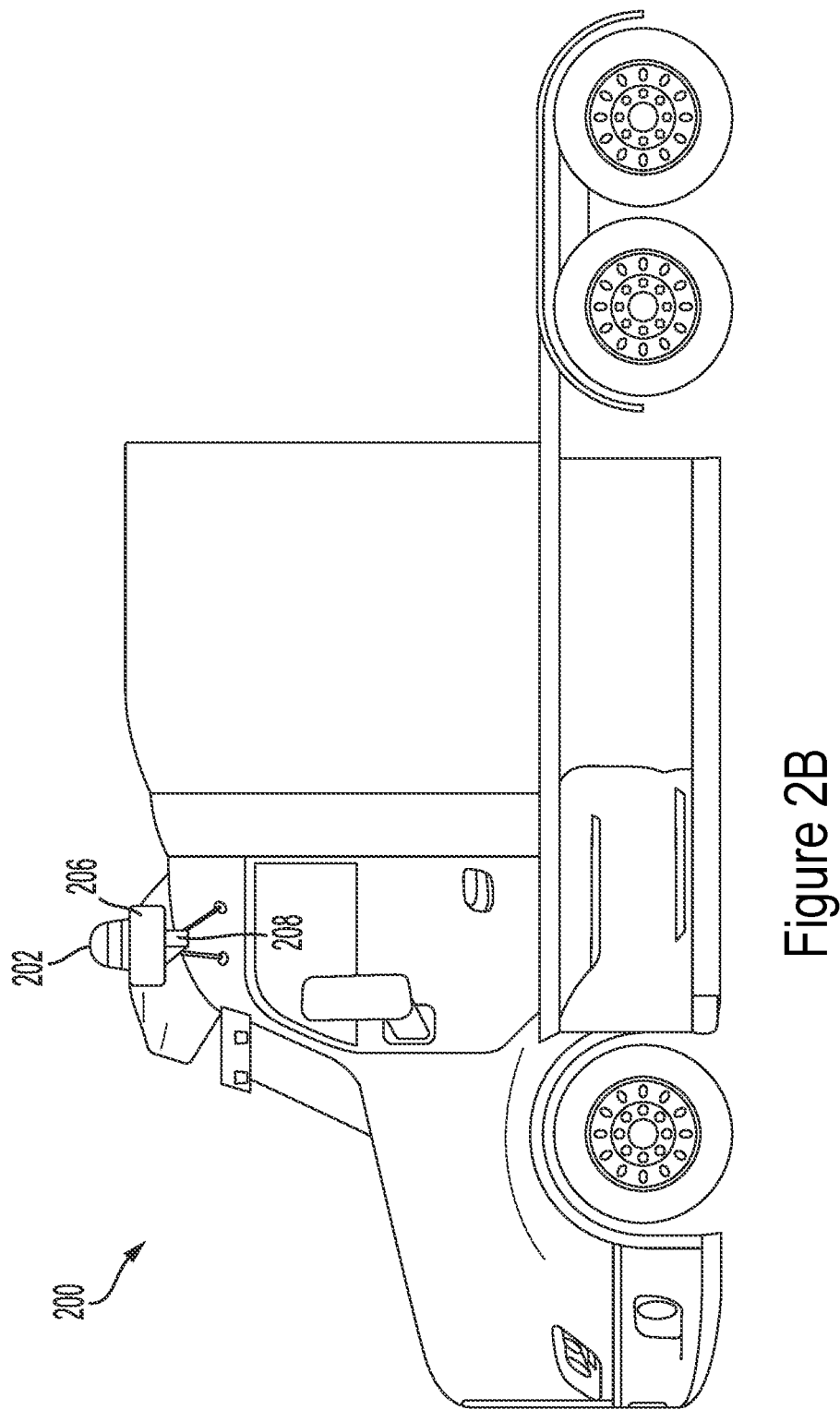
FIG. 2B illustrates a side view of a vehicle, according to one or more example embodiments.
Figure 2C:
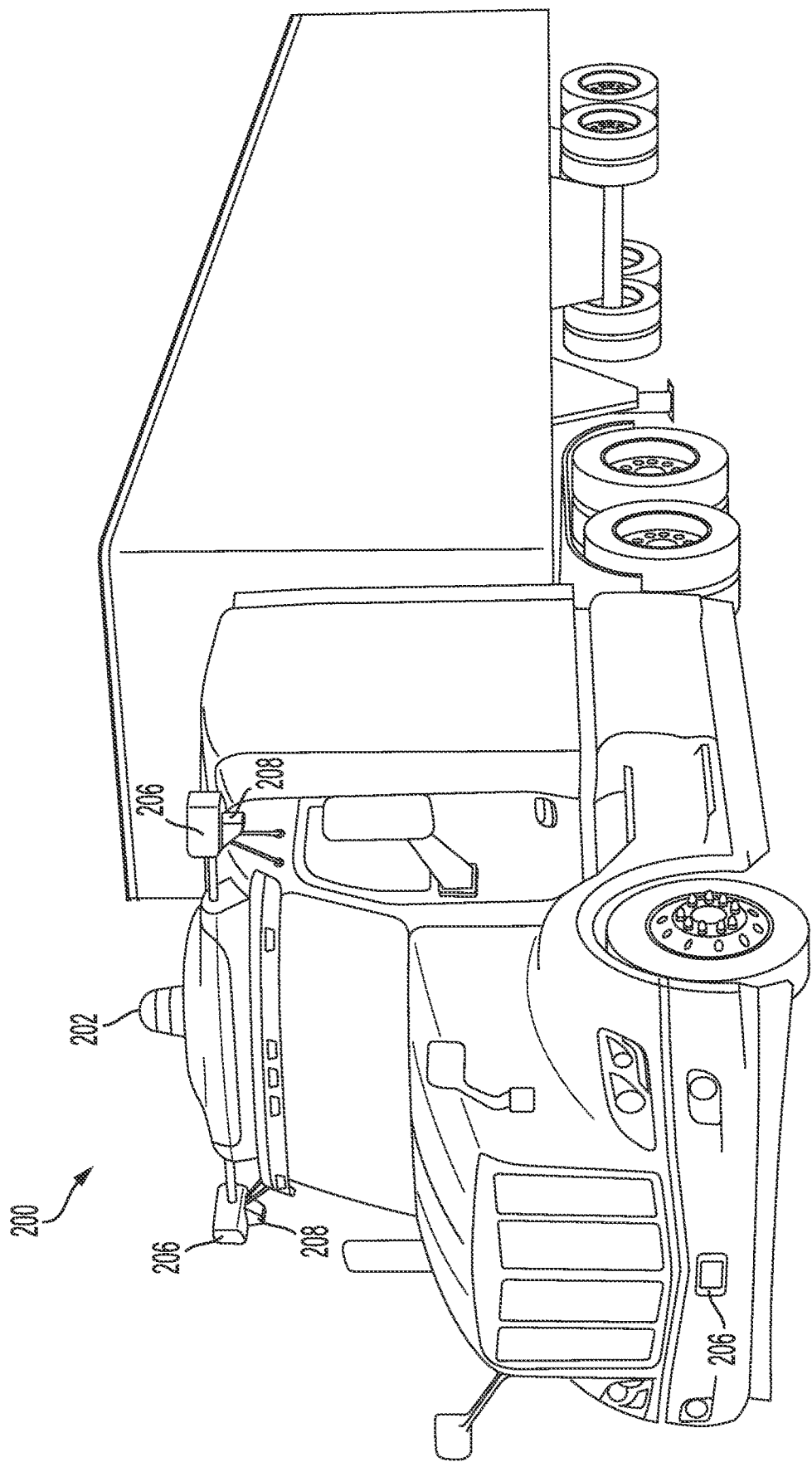
FIG. 2C illustrates a perspective view of a vehicle, according to one or more example embodiments.
Figure 2D:
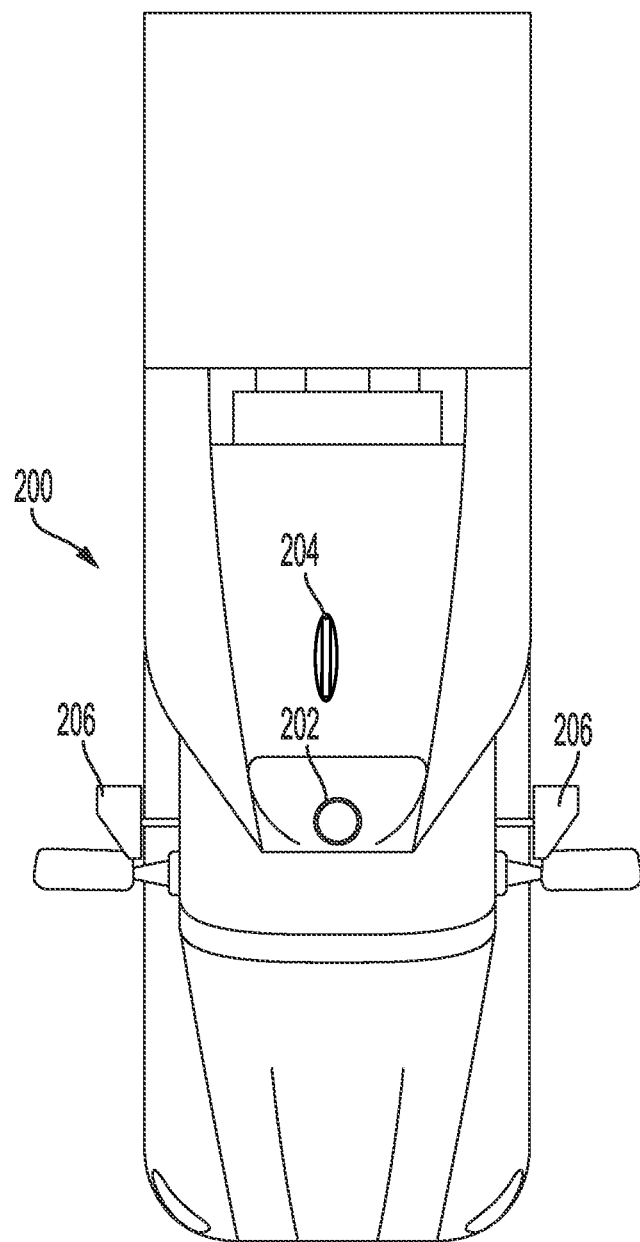
FIG. 2D illustrates a top view of a vehicle, according to one or more example embodiments.

FIG. 2A illustrates a front view of vehicle 200, FIG. 2B illustrates a side view of vehicle 200, FIG. 2C illustrates a perspective view of vehicle 200, and FIG. 2D illustrates a top view of vehicle 200. As such, FIGS. 2A-2D together illustrate an example physical configuration of vehicle 200, which may represent one possible physical configuration of vehicle 100 described in reference to FIG. 1. Depending on the embodiment, vehicle 200 may include sensor unit 202, wireless communication system 204, radar unit 206, lidar units 208, and camera 210, among other possible components. For instance, vehicle 200 may include some or all of the elements of components described in FIG. 1. Although vehicle 200 is depicted in FIG. 2 as a semi-truck, vehicle 200 can have other configurations within examples, such as a car, a van, a motorcycle, a bus, a shuttle, a golf cart, an off-road vehicle, robotic device, a farm vehicle, or other vehicles pulling a trailer among other possible examples.

Sensor unit 202 may include one or more sensors configured to capture information of the surrounding environment of vehicle 200. For example, sensor unit 202 may include any combination of cameras, radars, lidars, range finders, radio devices (e.g., Bluetooth and/or 802.11), and acoustic sensors, among other possible types of sensors. In some implementations, sensor unit 202 may include one or more movable mounts operable to adjust the orientation of sensors in sensor unit 202. For example, the movable mount may include a rotating platform that can scan sensors so as to obtain information from each direction around vehicle 200. The movable mount of sensor unit 202 may also be movable in a scanning fashion within a particular range of angles and/or azimuths.

In some implementations, sensor unit 202 may include mechanical structures that enable sensor unit 202 to be mounted atop the roof of a truck. Additionally, other mounting locations are possible within examples.

Wireless communication system 204 may have a location relative to vehicle 200 as depicted in FIG. 2D, but can also have different locations. Wireless communication system 204 may include one or more wireless transmitters and one or more receivers that may communicate with other external or internal devices. For example, wireless communication system 204 may include one or more transceivers for communicating with a user's device, other vehicles, and roadway elements (e.g., signs, traffic signals), among other possible entities. As such, vehicle 200 may include one or more vehicular communication systems for facilitating communications, such as dedicated short-range communications (DSRC), radio frequency identification (RFID), and other proposed communication standards directed towards intelligent transport systems. Communication system 204 may include a cellular or wireless data connection and may be configured to communicate with a remote computing system. The remote computing system may be configured to provide instructions and/or data to vehicle 200 to aid in its autonomous operation.

Vehicle 200 may include several radar units 206 at various locations. In one example, vehicle 200 may include a radar unit located on each of the front and back bumpers of the cab portion. Additionally, vehicle 200 may include two radar units located on each side of vehicle 200 near the side-view mirrors. The two radar units on the sides of the vehicle may be positioned so that one images a forward right section, one images a forward left section, one images a rear right section, and one images a rear left section. Each radar unit may be configured to transmit and receive radar signals over an angular region defined by a beamwidth of the radar unit. In some examples, each radar unit may be able to perform beam steering on transmit or receive beams. By using beam steering, a radar unit may be able to interrogate a predefined angular direction.

Vehicle 200 may also include lidar units 208 mounted in various locations. For example, lidar units 208 may also be mounted on the sides of vehicle 200 near the rear-view mirrors. Lidar units 208 may be configured to transmit and receive light signals from the region around the vehicle. Lidar units 208 may be able to image the region around vehicle 200 from which light reflections are received.

Camera 210 may have various positions relative to vehicle 200, such as a location above a front windshield of vehicle 200. As such, camera 210 may capture images of the environment. For instance, camera 210 may capture images from a forward-looking view with respect to vehicle 200, but other mounting locations (including movable mounts) and viewing angles of camera 210 are possible within implementations. In some examples, camera 210 may correspond to one or more visible light cameras, but can also be other types of cameras (e.g., infrared sensor). Camera 210 may also include optics that may provide an adjustable field of view.

Figure 3:
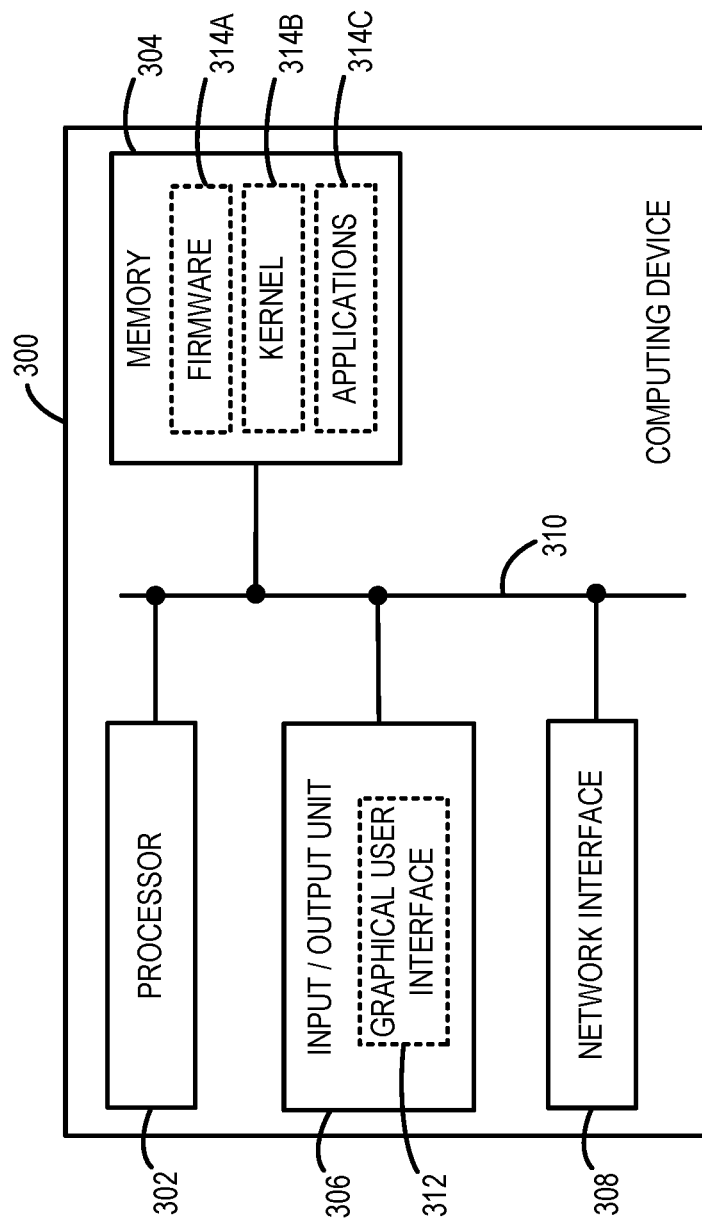
FIG. 3 is a functional block diagram illustrating a computing device, according to one or more example embodiments.

FIG. 3 is a simplified block diagram of computing device 300, illustrating some of the components that could be included in a computing device arranged to operate in accordance with the embodiments herein. Computing device 300 could be a client device (e.g., a device actively operated by a user (e.g., a remote operator)), a server device (e.g., a device that provides computational services to client devices), or some other type of computational platform. In some embodiments, computing device 300 may be implemented as computer system 112, which can be located on vehicle 100 and perform processing operations related to vehicle operations. For example, computing device 300 can be used to process sensor data received from sensor system 104. Alternatively, computing device 300 can be located remotely from vehicle 100 and communicate via secure wireless communication. For example, computing device 300 may operate as a remotely positioned device that a remote human operator can use to communicate with one or more vehicles.

In the example embodiment shown in FIG. 3, computing device 300 includes processing system 302, memory 304, input/output unit 306 and network interface 308, all of which may be coupled by a system bus 310 or a similar mechanism. In some embodiments, computing device 300 may include other components and/or peripheral devices (e.g., detachable storage, sensors, and so on).

Processing system 302 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processing system 302 may be one or more single-core processors. In other cases, processing system 302 may be one or more multi-core processors with multiple independent processing units. Processing system 302 may also include register memory for temporarily storing instructions being executed and related data, as well as cache memory for temporarily storing recently-used instructions and data.

Memory 304 may be any form of computer-usable memory, including but not limited to random access memory (RAM), read-only memory (ROM), and non-volatile memory. This may include flash memory, hard disk drives, solid state drives, rewritable compact discs (CDs), rewritable digital video discs (DVDs), and/or tape storage, as just a few examples.

Computing device 300 may include fixed memory as well as one or more removable memory units, the latter including but not limited to various types of secure digital (SD) cards. Thus, memory 304 can represent both main memory units, as well as long-term storage. Other types of memory may include biological memory.

Memory 304 may store program instructions and/or data on which program instructions may operate. By way of example, memory 304 may store these program instructions on a non-transitory, computer-readable medium, such that the instructions are executable by processing system 302 to carry out any of the methods, processes, or operations disclosed in this specification or the accompanying drawings.

As shown in FIG. 3, memory 304 may include firmware 314A, kernel 314B, and/or applications 314C. Firmware 314A may be program code used to boot or otherwise initiate some or all of computing device 300. Kernel 314B may be an operating system, including modules for memory management, scheduling and management of processes, input/output, and communication. Kernel 314B may also include device drivers that allow the operating system to communicate with the hardware modules (e.g., memory units, networking interfaces, ports, and busses), of computing device 300. Applications 314C may be one or more userspace software programs, such as web browsers or email clients, as well as any software libraries used by these programs. In some examples, applications 314C may include one or more neural network applications and other deep learning-based applications. Memory 304 may also store data used by these and other programs and applications.

Input/output unit 306 may facilitate user and peripheral device interaction with computing device 300 and/or other computing systems. Input/output unit 306 may include one or more types of input devices, such as a keyboard, a mouse, one or more touch screens, sensors, biometric sensors, and so on. Similarly, input/output unit 306 may include one or more types of output devices, such as a screen, monitor, printer, speakers, and/or one or more light emitting diodes (LEDs). Additionally or alternatively, computing device 300 may communicate with other devices using a universal serial bus (USB) or high-definition multimedia interface (HDMI) port interface, for example. In some examples, input/output unit 306 can be configured to receive data from other devices. For instance, input/output unit 306 may receive sensor data from vehicle sensors.

As shown in FIG. 3, input/output unit 306 includes GUI 312, which can be configured to provide information to a remote operator or another user. GUI 312 may involve one or more display interfaces, or another type of mechanism for conveying information and receiving inputs. In some examples, the representation of GUI 312 may differ depending on a vehicle situation. For example, computing device 300 may provide GUI 312 in a particular format, such as a format with a single selectable option for a remote operator to select from.

Network interface 308 may take the form of one or more wireline interfaces, such as Ethernet (e.g., Fast Ethernet, Gigabit Ethernet, and so on). Network interface 308 may also support communication over one or more non-Ethernet media, such as coaxial cables or power lines, or over wide-area media, such as Synchronous Optical Networking (SONET) or digital subscriber line (DSL) technologies. Network interface 308 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 308. Furthermore, network interface 308 may comprise multiple physical interfaces. For instance, some embodiments of computing device 300 may include Ethernet, BLUETOOTH®, and Wifi interfaces. In some embodiments, network interface 308 may enable computing device 300 to connect with one or more vehicles to allow for remote assistance techniques presented herein.

In some embodiments, one or more instances of computing device 300 may be deployed to support a clustered architecture. The exact physical location, connectivity, and configuration of these computing devices may be unknown and/or unimportant to client devices. Accordingly, the computing devices may be referred to as "cloud-based" devices that may be housed at various remote data center locations. In addition, computing device 300 may enable the performance of embodiments described herein, including efficient assignment and processing of sensor data. Computing device 300 may perform techniques described herein.

Figure 4A:
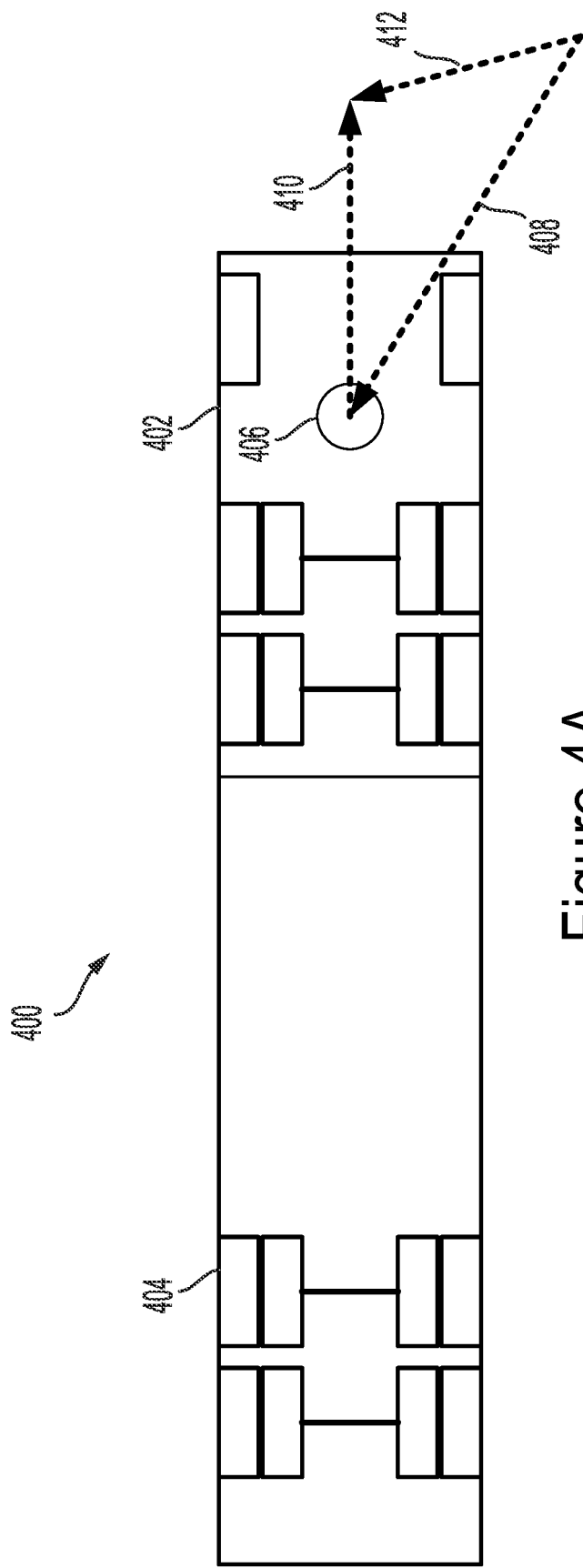
FIG. 4A depicts a vehicle estimating the ambient ground relative wind using wind data from an onboard wind sensor, according to one or more example embodiments.

FIG. 4A depicts vehicle 400 performing disclosed techniques to estimate ambient ground relative wind speed using wind data from onboard wind sensor 406. In the example embodiment, vehicle 400 is shown as tractor 402 pulling trailer 404 with onboard wind sensor 406 positioned in a center location on tractor 402. In other examples, vehicle 400 may be a different type of vehicle and can include one or more wind sensors in other arrangements.

Windy conditions can impact the navigation of vehicle 400. For instance, strong winds can cause vehicle 400 to sway and lose balance and may even push vehicle 400 into the path of other vehicles, off the side of the road, or across a median. To counter the effect of windy conditions, vehicle 400 may perform disclosed operations using wind data from onboard wind sensor 406 to estimate ambient ground relative wind speed and subsequently adjust vehicle behavior in real-time.

In the example embodiment, the apparent air speed and direction measurements obtained by wind sensor 406 is represented as air speed and direction vector 408. As shown, wind data from wind sensor 406 indicates that wind gusts are detected at a slight cross angle relative to a heading of vehicle 400. As further shown in FIG. 4A, vehicle trajectory vector 410 can be used to represent the speed and direction of vehicle 400. An onboard computing system may use information from one or multiple vehicle sensors to determine vehicle trajectory vector 410. As such, the onboard computing system may then estimate ambient wind vector 412 based on a combination of air speed and direction vector 408 and vehicle trajectory vector 410. Ambient wind vector 412 represents the direction and the speed of ambient ground relative wind relative to the ground, which can be used to adjust behavior of vehicle 400 in real-time. As further shown in FIG. 4A, the real time ambient ground relative wind speed is represented by ambient vector 412, which is shown as the result of adding vehicle trajectory vector 410 to the air speed and direction vector 408. In some embodiments, the ambient crosswind relative to vehicle 400 can be calculated as the crosswind component of the wind speed and direction measurement from onboard wind sensor 406.

In the example embodiment shown in FIG. 4A, wind sensor 406 is located onboard and in a center position on vehicle 400. For instance, wind sensor 406 may be positioned on a single unicorn boom that extends above a hood of vehicle 400. In other embodiments, wind sensor 406 can have other positions, such as located directly on exterior portions of vehicle 400 or as part of a sensor stack with one or more other sensors. In some embodiments, vehicle 400 may include a dual wind speed sensor setup with sensors positioned on different sides of vehicle 400. In such a configuration, outputs from the wind sensors can be used to provide redundancy in sensor measurements. For example, if the sensor readings from both wind sensors are mismatched significantly, the detected difference can trigger one or more faults affecting the behavior of vehicle 400.

In some embodiments, wind sensor 406 can be deployable and/or retractable. As an example result, wind sensor 406 can be deployed for use during some circumstances and retracted during others. For example, vehicle 400 can automatically raise or lower wind sensor 406 based on one or more height restrictions identified within the environment (e.g., bridges or tunnels) based on map data and/or detected in real-time via vehicle sensors. Lidar and/or other types of sensors (e.g., cameras) can be used to detect a low height clearance (e.g., an upcoming bridge or tunnel) during navigation of a path, which may trigger a mechanical system to move (e.g., fold down) wind sensor to fold down (e.g., via a spring and latch mechanism). In addition, aerodynamic corrections can be used to correct the altered wind speed or direction effects caused by onboard wind sensor 406 or other elements of vehicle 400. For instance, the correction can be a simple constant scale factor or may vary as a function of the current speed of vehicle 400. In some cases, the scale factor may vary as a function of the speed and/or direction of vehicle 400 and/or the direction or speed of the wind. The correction can also depend on the geometry of vehicle 400 or the location of wind sensor 406 (or multiple wind sensors).

Wind sensor 406 can obtain and provide frequent real time apparent air speed and direction measurements to an onboard computing system located on vehicle 400. In some embodiments, the wind speed and/or direction measurements are filtered by vehicle systems using a moving average or moving window time based filter to dampen the effects of noise or insignificant transient wind pulses.

Wind sensor 406 can be a two dimensional (2D) or three-dimensional (3D) solid state ultrasound, thermal or acoustic anemometer that can provide both wind speed and direction measurements. In other embodiments, wind sensor 406 is a one dimensional (1D) solid state ultrasound, thermal or acoustic air speed sensor that provides wind speed in the crosswind or lateral direction. In some examples, wind sensor 406 is a plate with a force or moment sensor or a pitot tube. In some embodiments the wind sensor uses acoustic resonance technology. In some embodiments, wind sensor 406 is a lidar, which may use the Doppler backscatter signals from particles suspended in the air (e.g. dust) to provide wind speed data.

The onboard computing system may adjust behavior of vehicle 400 based on ambient vector 412. For instance, the onboard computing system may adjust behavior of vehicle 400 when ambient vector 412 exceeds or approaches one or more thresholds or values. In some cases, the behavior alteration of vehicle 400 may include stopping, slowing, pulling over or resuming a trip, among other options. In some cases, vehicle 400 may respond in a slowing or stopping manner very quickly, whilst conversely may respond in a speeding up or resumption manner relatively slower.

In some cases, the behavior response for vehicle 400 in the presence of wind may include modifying controller gains (e.g., softening or tightening controller gains) and/or biasing the cross track position or trajectory of the tractor in the direction of the wind. The behavior response can account for wind forces when estimating placement of a friction ellipse or placement relative to lateral roll thresholds of the vehicle. The friction ellipse can represent elliptical acceleration limits due to tire friction limits. For example, wind forces can be included in the overall lateral and longitudinal acceleration limits, along with other forces as caused by, for instance longitudinal or lateral acceleration. Doing this means that a more accurate representation of the total forces acting on vehicle 400 are factored to ensure the vehicle remains safe and stable. When approaching the limits of safety or instability, the behavior of vehicle 400 can be modified accordingly (i.e. by slowing down or pulling over) in accordance with industry and safety best practices. In some embodiments, the prior lookup is performed through a machine learned model by inference, for example against a deep learned model which relates apparent wind speed with vehicle speed/direction control outputs.

In some cases, the estimated ambient wind speed is used independently of the estimated ambient wind direction when considering the behavioral response for vehicle 400. In other cases, the estimated ambient wind direction is also used and may be factored into the behavioral response calculation, for example, by considering the crosswind component relative to the vehicle heading. In some cases, one or more air pressure, temperature or humidity sensors or data sources (e.g. remote observations) may be used in the calculation of the behavioral response of vehicle 400. In some cases, these may be used to estimate the total lateral acceleration or roll moment induced on vehicle 400 by the wind.

In some embodiments, vehicle 400 can affect the speed and direction of the wind during navigation. In particular, air is forced around vehicle 400 during navigation at different speeds. In some cases, one or more aerodynamic corrections can be applied to the raw air speed and/or direction measurements from onboard wind sensor 406 to cancel the effects on the wind caused by vehicle 400. For example, onboard wind sensor 406 can be positioned away from the body of the vehicle (e.g. high above the trailer) so that these effects are non-existent or insignificant. In some cases, wind measurements from vehicle 400 may be stored or communicated in a map or to one or more nearby vehicles (or a central system) to provide advance information or to augment other vehicles, which may not include one or more wind sensors.

In some examples, one or more behavior threshold curves may be defined for adjusting operation of vehicle 400. In some cases, the threshold or thresholds can be a function of the vehicle payload.

Figure 4B:
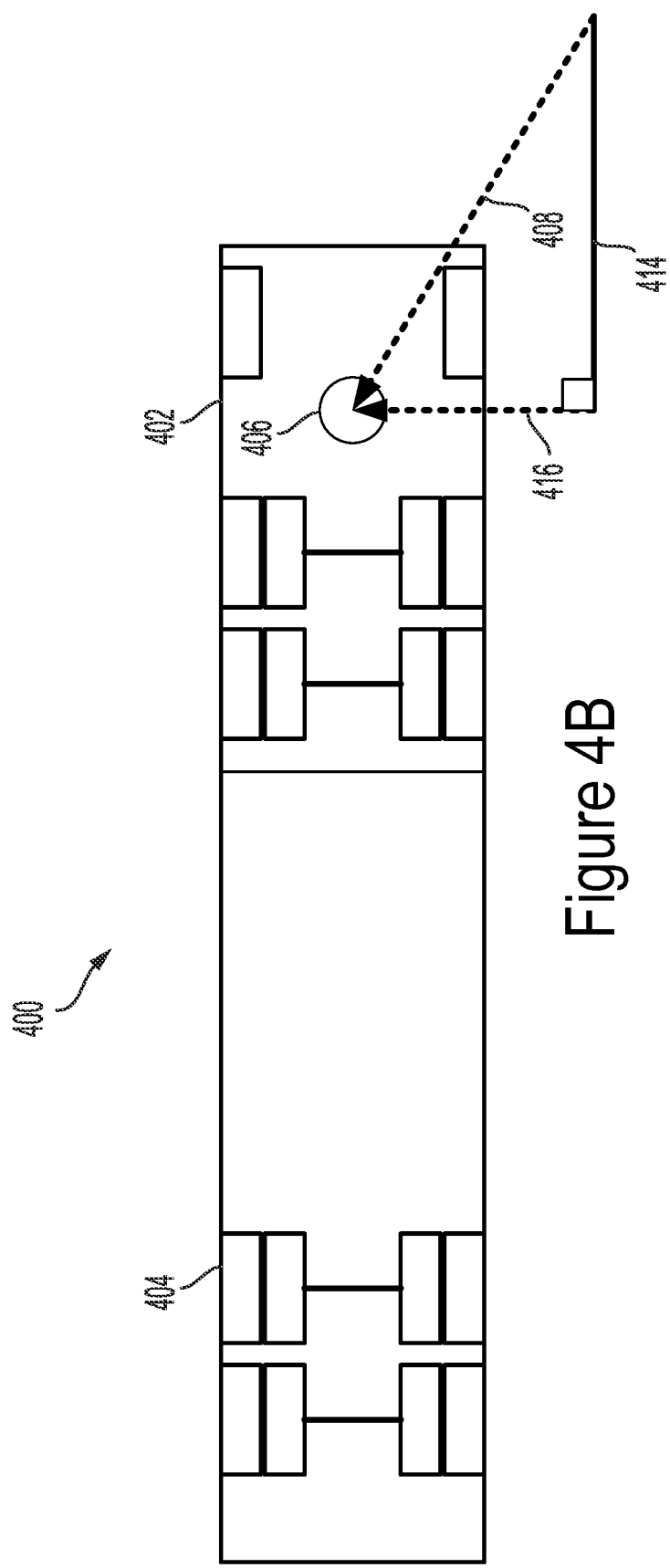
FIG. 4B depicts the vehicle estimating the cross wind speed using wind data from the onboard wind sensor, according to one or more example embodiments.

FIG. 4B depicts vehicle 400 estimating the cross wind speed 416 using wind data from wind sensor 406. In some cases, vehicle 400 may use the cross wind speed 416. The cross wind speed 416 can be determined based on wind data from wind sensor 406. Vehicle systems may use the cross wind speed 416 in addition to the total ambient wind speed. In other cases, vehicle systems may use the cross wind speed 416 to adjust vehicle behavior without the total ambient wind speed.

In some examples, vehicle 400 may estimate the cross wind speed 416 based on air speed measurements 414 obtained by wind sensor 406. In such cases, vehicle 400 can determine the cross wind speed 416 without using vehicle navigation data. In other examples, the cross wind speed 416 may be extracted from the ambient vector 412.

Figure 5A:
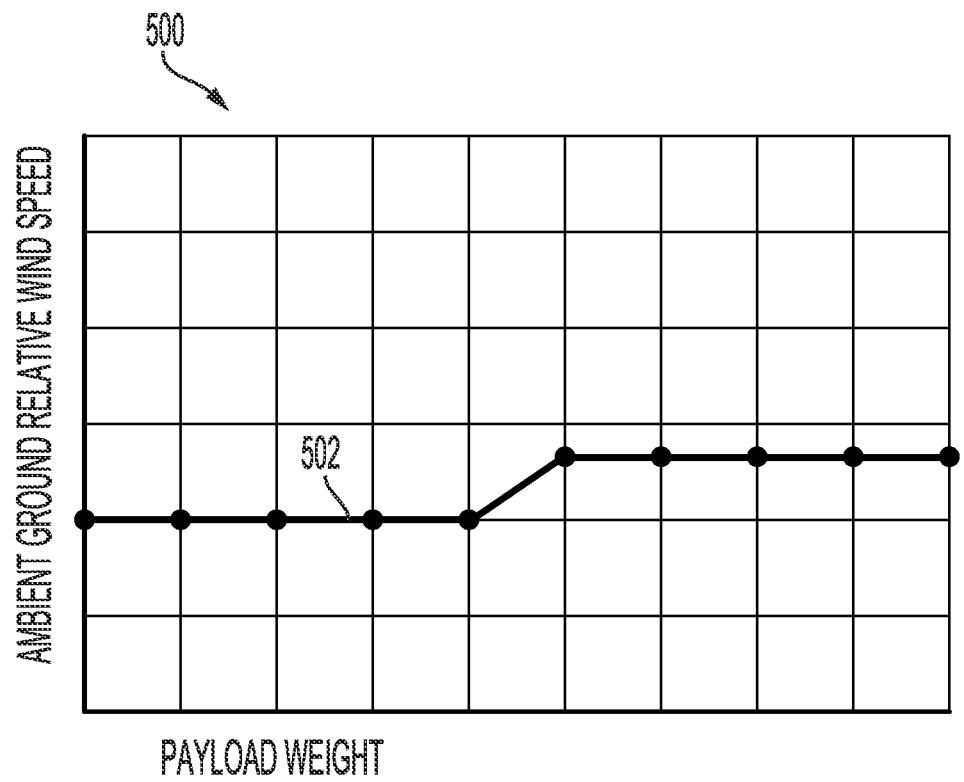
FIG. 5A illustrates a graph showing a behavior threshold curve for adjusting vehicle behavior based on ambient ground relative wind speed, according to one or more example embodiments.

FIG. 5A illustrates graph 500 showing behavior threshold curve 502 for adjusting vehicle behavior based on ambient ground relative wind speed. Behavior threshold curve 502 may be used to indicate the point at which a vehicle (e.g., vehicle 400) may adjust speed on the basis of the estimated ambient wind speed. This slow down effect may be continuously increased in magnitude as the estimated ambient wind speed approaches a prior pullover or stopping threshold curve.

Figure 5B:
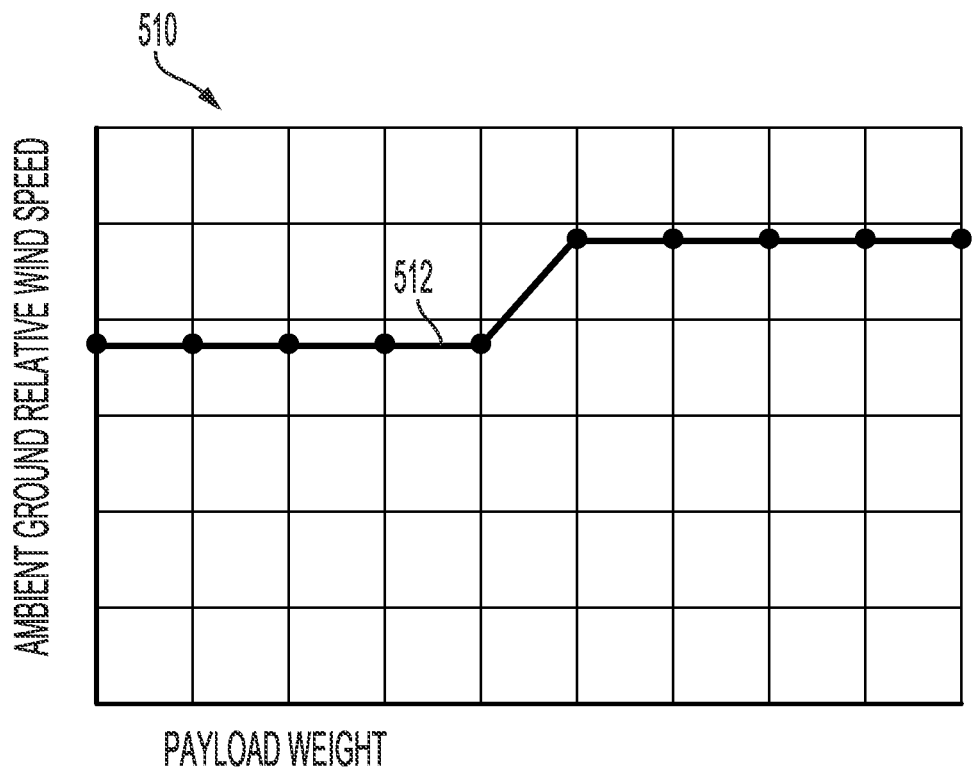
FIG. 5B illustrates another graph showing a behavior threshold curve for adjusting vehicle behavior based on ambient ground relative wind speed, according to one or more example embodiments.

FIG. 5B illustrates graph 510 showing behavior threshold curve 512, which may represent a prior pullover or stopping threshold curve. In some cases, after vehicle 400 has pulled over or stopped, wind sensor 406 may be used to verify the wind has reduced below a safe threshold. In some instances, vehicle 400 may then use a prior resumption threshold curve to determine when to resume the trip. The resumption threshold curve may incorporate a buffer to introduce hysteresis against the prior pullover or stopping behavior threshold curve 512. A curve is used in each of FIGS. 5A, 5B to show that the thresholds may vary as a function of the vehicle payload.

Figure 6A:
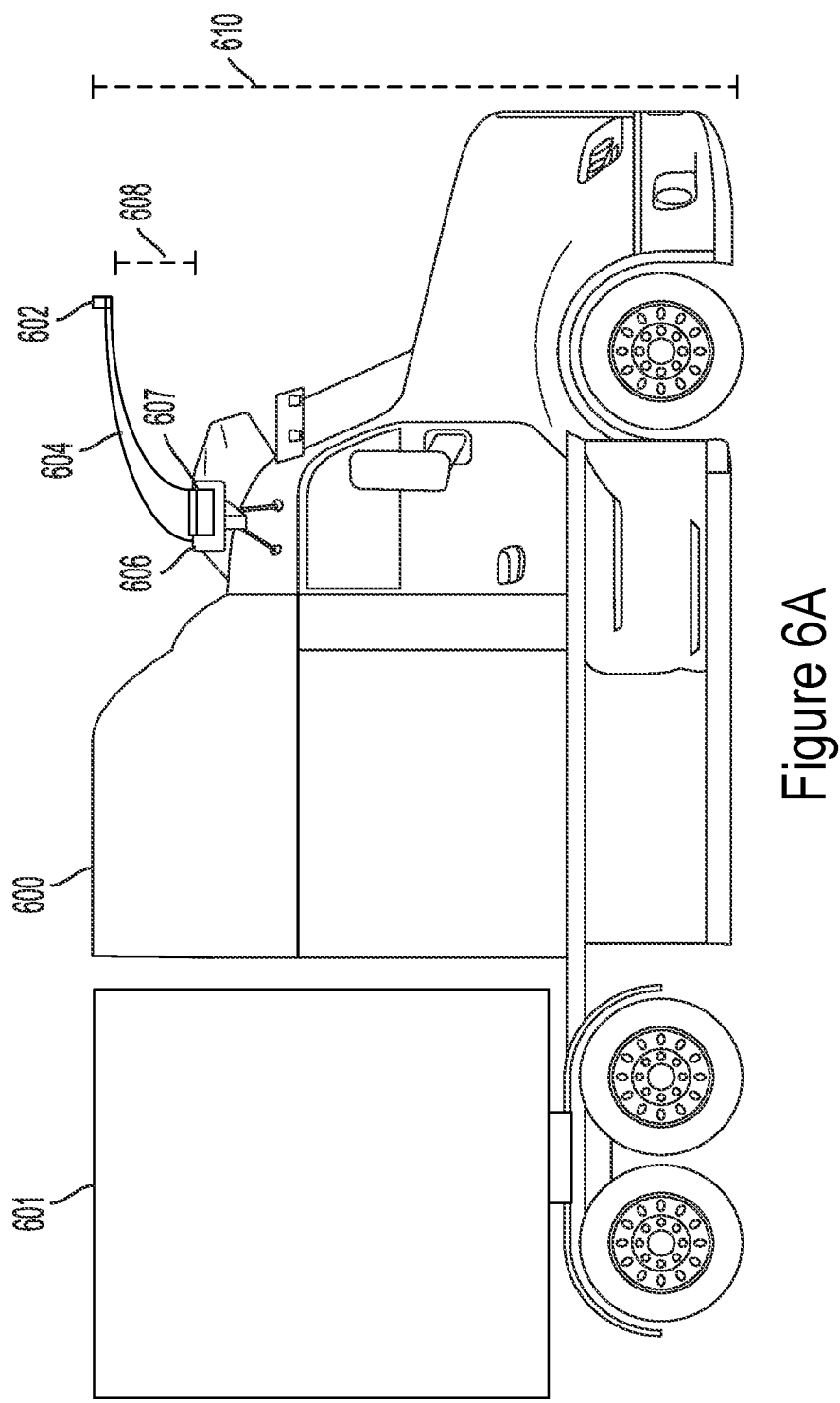
FIG. 6A illustrates a side view of a vehicle configured with a wind sensor for obtaining real-time air speed and direction measurements, according to one or more example embodiments.

FIG. 6A illustrates a side view of vehicle 600 configured with wind sensor 602 for obtaining real-time air speed and direction measurements. In the example embodiment, wind sensor 602 is positioned on an end of boom 604, which is shown as extending from sensor bar 606. In other examples, wind sensor 602 can be located on vehicle 600 at other positions.

As shown in FIG. 6A, wind sensor 602 may avoid obstructing size regulations while also being in a position that avoids interfering with the field of view of autonomous vehicle sensors. In addition, the location can enable wind sensor 602 to capture fairly undisturbed wind measurements, including when vehicle 600 is moving at higher speeds (e.g., highway driving). In the example embodiment, wind sensor 602 shown at height difference 608 above sensor 607. This way, wind sensor 602 may avoid the field of view of sensor 607 and minimize impact to operations of sensor 607 and other sensors. Wind sensor 602 is also shown positioned at height 610 relative to the ground. This may enable wind sensor 602 to obtain accurate measurements of wind gusts above other vehicles traveling in the environment.

Figure 6B:
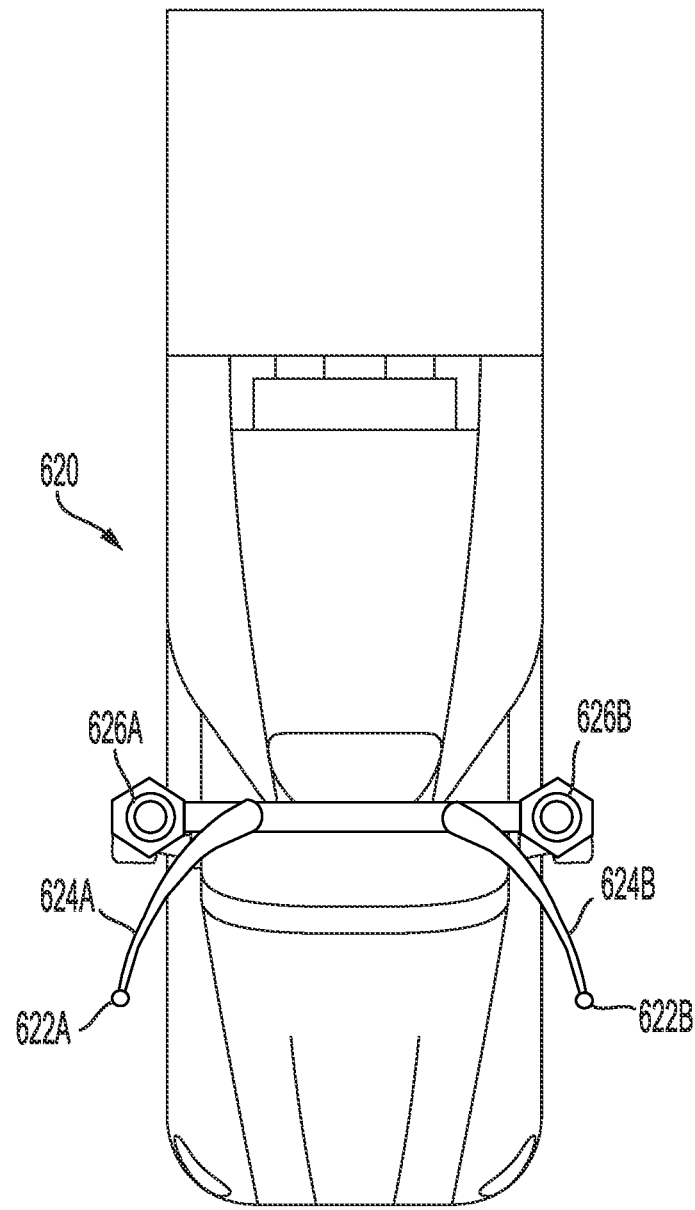
FIG. 6B illustrates a top down view of another vehicle configured with multiple onboard wind sensors, according to one or more example embodiments.

FIG. 6B illustrates a top down view of another vehicle 620 configured with wind sensors 622A, 622B for obtaining real-time air speed and direction measurements. In the example embodiment, wind sensors 622A, 622B are shown coupled to vehicle 620 via a pair of booms 624A, 624B, respectively. In particular, wind sensor 622A is connected via boom 624A and has a position nearby sensor 626A and wind sensor 622B is connected via boom 624B and has a position nearby sensor 626B.

At the example locations illustrated in FIG. 6B, wind sensor 622A and wind sensor 622B may minimize impact on the operations of sensors 626A, 626B. The height and orientation of each wind sensor 622A, 622B can minimize obstruction with the field of views of sensors 626A, 626B. As shown in the example embodiment, wind sensors 622A, 622B are positioned at an outside alignment relative to sensors 626A, 626B positioned on vehicle 620. In some examples, wind sensors 622A, 622B can be flush with the tractor, cabin, trailer, mirrors or another outer limit of a vehicle. In addition, the curvature and configuration (e.g., length and thickness) of booms 624A, 624B can vary within examples and may be configured based on wind tunnel tests.

Figure 7:
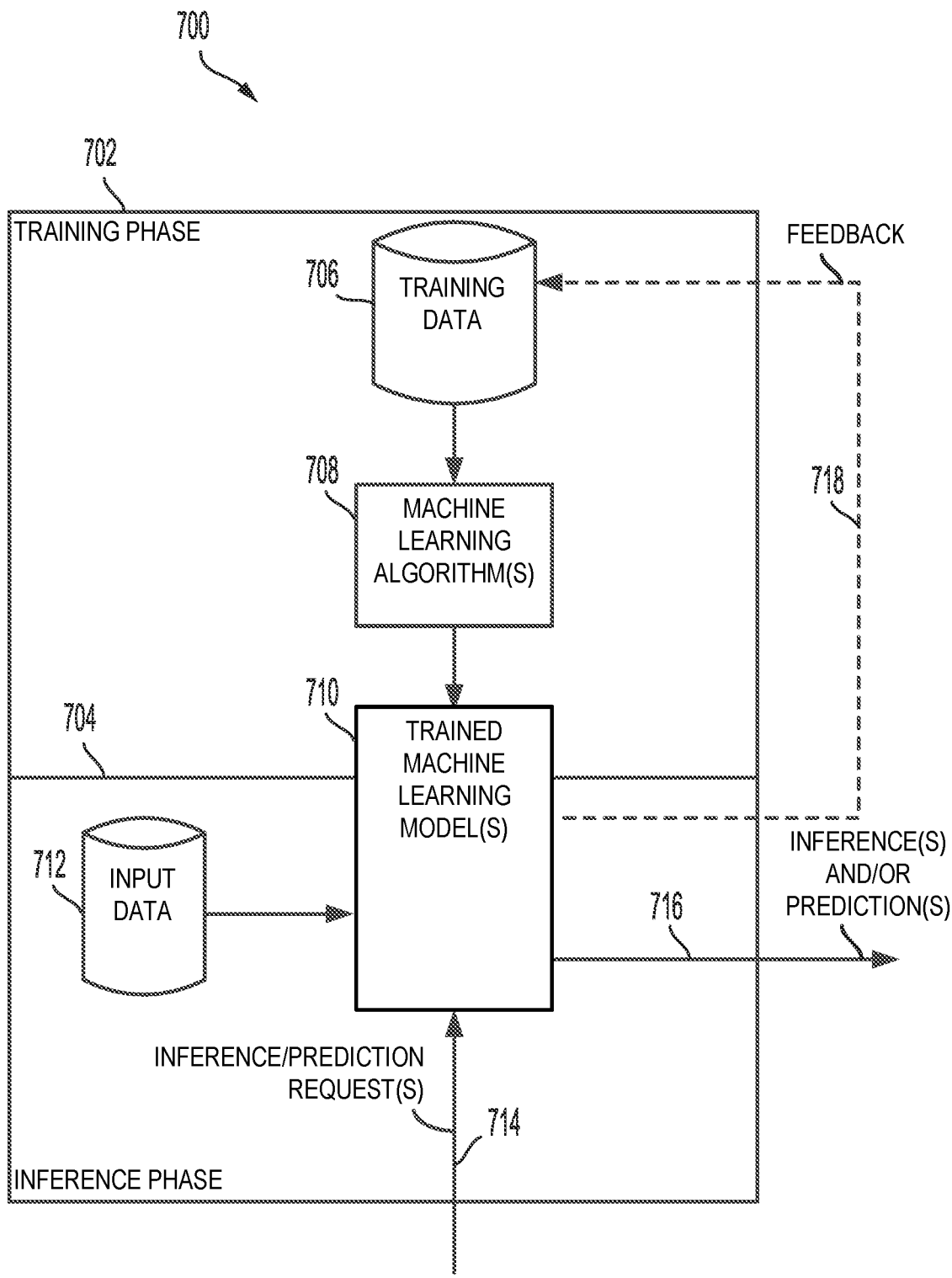
FIG. 7 is a block diagram illustrating a training phase and an inference phase for generating trained machine learning models, according to one or more example embodiments.

FIG. 7 shows diagram 700 illustrating training phase 702 and inference phase 704 of trained machine learning model(s) 710. Trained machine learning models 710 can be generated and used for performing disclosed techniques. For instance, a vehicle can use air speed and direction data received via an onboard wind sensor and the vehicle's trajectory and total mass as inputs into a module that uses one or multiple trained machine learning models to estimate ambient ground relative wind speed and direction or the appropriate behavioral response.

Some machine learning techniques involve training one or more machine learning algorithms on an input set of training data to recognize patterns in the training data and provide output inferences and/or predictions about (patterns in the) training data. The resulting trained machine learning algorithm can be termed as a trained machine learning model. As an example, training phase 702 involves one or more machine learning algorithms 708, which can be trained on training data 706 and used to generate trained machine learning model(s) 710. Then, during inference phase 704, trained machine learning model(s) 710 can receive input data 712 and one or more inference/prediction requests 714 and responsively output one or more inferences and/or predictions 716.

Trained machine learning model(s) 710 can include one or more models of one or more machine learning algorithms 708. Machine learning algorithm(s) 708 may include, but are not limited to: an artificial neural network (e.g., a convolutional neural network, a recurrent neural network, a Bayesian network, a hidden Markov model, a Markov decision process, a logistic regression function, a support vector machine, a suitable statistical machine learning algorithm, and/or a heuristic machine learning system). Machine learning algorithm(s) 708 may be supervised or unsupervised, and may implement any suitable combination of online and offline learning.

In some examples, machine learning algorithm(s) 708 and/or trained machine learning model(s) 710 can be accelerated using on-device coprocessors, such as graphic processing units (GPUs), tensor processing units (TPUs), digital signal processors (DSPs), and/or application specific integrated circuits (ASICs). Such on-device coprocessors can be used to speed up machine learning algorithm(s) 708 and/or trained machine learning model(s) 710. In some examples, trained machine learning model(s) 710 can be trained, reside on, and executed to provide inferences on a particular computing device, and/or otherwise can make inferences for the particular computing device.

Training phase 702 can involve inputting training data 706 into training machine learning algorithm(s) 708 via unsupervised, semi-supervised, supervised, and/or reinforcement learning techniques. Unsupervised learning may involve providing a portion (or all) of training data 706 to machine learning algorithm(s) 708 and machine learning algorithm(s) 710 determining one or more output inferences based on the provided portion (or all) of training data 706. In some embodiments, training of the machine learning model may involve unsupervised learning based on a loss function that measures travel time, or a disengage probability, or both. Semi-supervised learning involves having correct results for part, but not all, of training data 706. During semi-supervised learning, supervised learning is used for a portion of training data 706 having correct results, and unsupervised learning is used for a portion of training data 706 not having correct results.

Supervised learning involves providing a portion of training data 706 to machine learning algorithm(s) 708, with machine learning algorithm(s) 708 determining one or more output inferences based on the provided portion of training data 706, and the output inference(s) are either accepted or corrected based on correct results associated with training data 706. In some examples, supervised learning of machine learning algorithm(s) 708 can be governed by a set of rules and/or a set of labels for the training input, and the set of rules and/or set of labels may be used to correct inferences of machine learning algorithm(s) 708. In some embodiments, training data 706 can include wind data examples.

For instance, sets of wind speed data and related scenarios can be included in training data 706.

In some instances, models developed through supervised learning can be used to help an autonomous vehicle make decisions in situations where it may adjust behavior based on wind conditions in the environment. For example, logged data from executed manual driving strategies, autonomous driving strategies, or both, on highway navigation and other roadways with various wind conditions may be utilized for supervised training of machine learning algorithm(s) 708. Data labelers may observe the scene, nearby traffic, and a pose of the autonomous vehicle. Data labelers may then label the situation as either "yes" to adjust vehicle behavior based on wind conditions, or as "no" to indicate no change is needed. In some examples, data labelers can label scenarios with specific navigation parameters. For instance, some scenes can be labeled as a specific driving speed or a slowdown amount. The labeled scenes can then be used as training data 706 to train machine learning algorithm(s) 708 that would help the autonomous truck make decisions in novel driving scenarios.

Supervised learning methods may be similarly applied to simulated data to significantly augment the training data 706. Artificial freeway windy navigation scenarios may be generated with various geometries, random traffic placements, random payload masses and distributions, random wind direction and speeds, and other variables. For example, with a simulated vehicle driving in particular wind conditions, the data labeler can label the situation as either "yes" to indicate adjusting vehicle behavior (e.g., pull over), or as "no" to indicate no behavior modification is needed. The labeled artificial scenes can be used as training data 706 to train machine learning algorithm(s) 708.

Reinforcement learning involves machine learning algorithm(s) 708 receiving a reward signal regarding a prior inference, where the reward signal can be a numerical value. During reinforcement learning, machine learning algorithm(s) 708 can output an inference and receive a reward signal in response, where machine learning algorithm(s) 708 are configured to try to maximize the numerical value of the reward signal. In some examples, reinforcement learning also utilizes a value function that provides a numerical value representing an expected total of the numerical values provided by the reward signal over time. For example, when a discrete decision is to be selected from two or more options or plans, such as, for example, continue to drive in a first lane or change lanes to a second lane, a policy may be constructed that scores each planned trajectory against a rubric of features.

For example, scored features of a trajectory may include (but may not be limited to) a progress made with each trajectory, a difficulty of performing an operation, an amount of acceleration needed by either the autonomous truck or other agents and/or vehicles in the scene in order to smoothly negotiate various wind and weather scenarios, a kinematic comfort of each trajectory, off-tracking or roll scored features (e.g., wheel load imbalance) or a minimum predicted buffer provided to other agents and/or vehicles at the scene. The total score for each possible trajectory may be a weighted sum of each scored feature, and the autonomous truck may follow a plan with a lowest score. The respective feature weights may be selected by a variety of automatic and/or heuristic methods. For example, feature weights may be learned from human driving behavior in situations with various wind conditions. Also, for example, for a set of trajectories driven by a human driver in such scenarios, a technique such as inverse reinforcement learning may be applied to compute the set of feature weights. Such an approach helps mimic a logic applied by a human driver.

In some examples, machine learning algorithm(s) 708 and/or trained machine learning model(s) 710 can be trained using other machine learning techniques, including but not limited to, incremental learning and curriculum learning.

In some examples, machine learning algorithm(s) 708 and/or trained machine learning model(s) 710 can use transfer learning techniques. For example, transfer learning techniques can involve trained machine learning model(s) 710 being pre-trained on one set of data and additionally trained using training data 706. More particularly, machine learning algorithm(s) 708 can be pre-trained on data from one or more computing devices and a resulting trained machine learning model provided to a particular computing device, where the particular computing device is intended to execute the trained machine learning model during inference phase 604. Then, during training phase 702, the pre-trained machine learning model can be additionally trained using training data 706, where training data 706 can be derived from kernel and non-kernel data of the particular computing device. This further training of the machine learning algorithm(s) 708 and/or the pre-trained machine learning model using training data 706 of the particular computing device's data can be performed using either supervised or unsupervised learning. Once machine learning algorithm(s) 708 and/or the pre-trained machine learning model has been trained on at least training data 706, training phase 702 can be completed. The trained resulting machine learning model can be utilized as at least one of trained machine learning model(s) 708.

In particular, once training phase 702 has been completed, trained machine learning model(s) 710 can be provided to a computing device, if not already on the computing device. Inference phase 704 can begin after trained machine learning model(s) 710 are provided to the particular computing device.

During inference phase 704, trained machine learning model(s) 710 can receive input data 712 and generate and output one or more corresponding inferences and/or predictions 716 about input data 712. As such, input data 712 can be used as an input to trained machine learning model(s) 708 for providing corresponding inference(s) and/or prediction(s) 716 to kernel components and non-kernel components. For example, trained machine learning model(s) 708 can generate inference(s) and/or prediction(s) 716 in response to one or more inference/prediction requests 714. In some examples, trained machine learning model(s) 710 can be executed by a portion of other software. For example, trained machine learning model(s) 710 can be executed by an inference or prediction daemon to be readily available to provide inferences and/or predictions upon request. Input data 712 can include data from the particular computing device executing trained machine learning model(s) 708 and/or input data from one or more computing devices other than the particular computing device.

Input data 712 can include one or more of real-world driving scenarios, simulated driving scenarios, or both. Artificial freeway windy conditions scenarios may be generated with various geometries, random traffic placements, random payload masses and distributions, random agent velocities, and/or random agent accelerations. In some embodiments, input data 712 includes wind speed data that can be used to generate trained machine learning model(s) 710 for vehicles to use to align performance with dynamic weather conditions. Other types of input data are possible as well.

Inference(s) and/or prediction(s) 716 can include output navigation plans, output driving strategies, and/or other output data produced by trained machine learning model(s) 710 operating on input data 712 (and training data 706). In some embodiments, output inference(s) and/or prediction(s) 716 may include predicted navigation plans of other vehicles (such as a vehicle that has a high probability of an interaction with the autonomous truck, a vehicle to the autonomous truck, a merging vehicle, and so forth). In some examples, trained machine learning model(s) 710 can use output inference(s) and/or prediction(s) 716 as input feedback 718. Trained machine learning model(s) 710 can also rely on past inferences as inputs for generating new inferences.

Deep neural nets for determining vehicle behavior adjustments can be examples of machine learning algorithm(s) 708. After training, the trained version of deep neural nets can be examples of trained machine learning model(s) 708. In this approach, an example of inference/prediction request(s) 714 can be a request to predict a driving strategy for an input scenario involving certain wind conditions and a corresponding example of inferences and/or prediction(s) 716 can be an output driving strategy.

Figure 8:
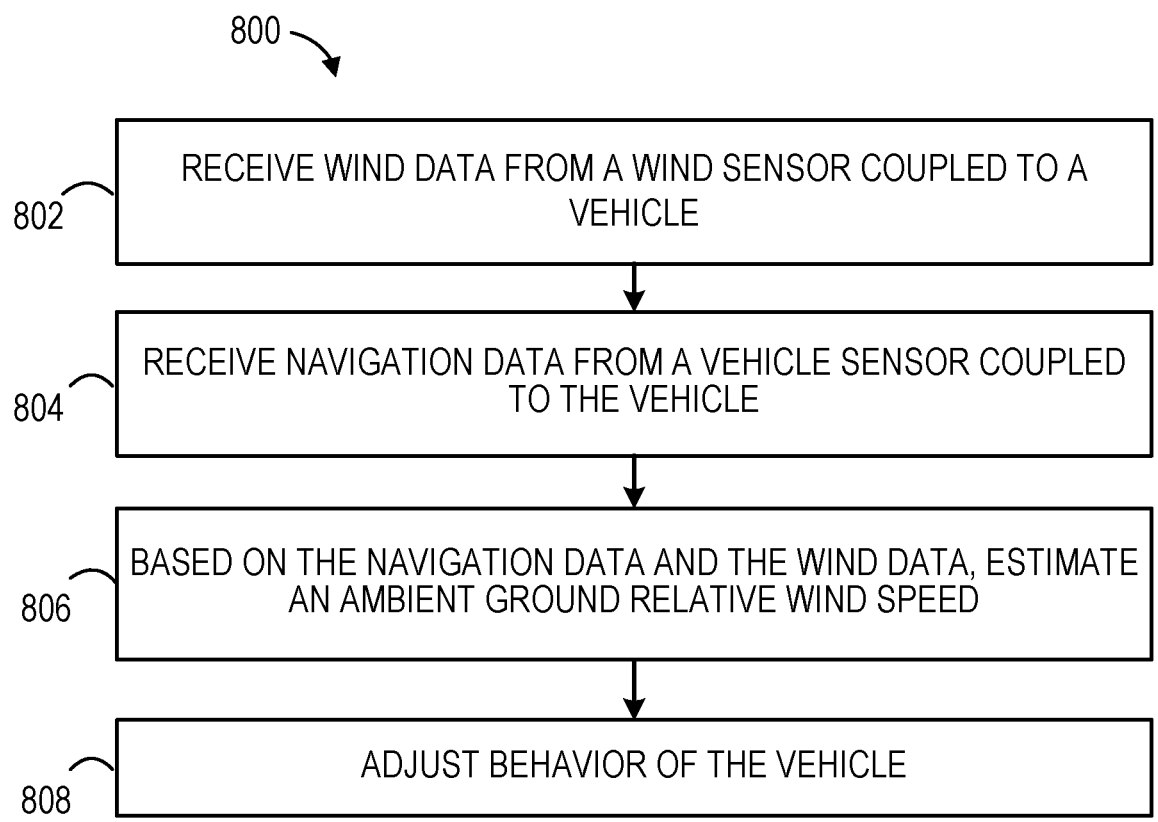
FIG. 8 is a flowchart of a method for adjusting vehicle behavior based on ambient ground relative wind speed, according to one or more example embodiments.

FIG. 8 is a flowchart of a method for adjusting vehicle behavior based on ambient ground relative wind speed. Method 800 represents an example method that may include one or more operations, functions, or actions, as depicted by one or more of blocks 802, 804, 806, and 808, each of which may be carried out by any of the systems, devices, and/or vehicles shown in FIGS. 1-7, among other possible systems. For instance, computing device 300 depicted in FIG. 3 may perform method 800.

Those skilled in the art will understand that the flowchart described herein illustrates functionality and operations of certain implementations of the present disclosure. In this regard, each block of the flowchart may represent a module, a segment, or a portion of program code, which includes one or more instructions executable by one or more processors for implementing specific logical functions or steps in the process. The program code may be stored on any type of computer readable medium, for example, such as a storage device including a disk or hard drive.

In addition, each block may represent circuitry that is wired to perform the specific logical functions in the process. Alternative implementations are included within the scope of the example implementations of the present application in which functions may be executed out of order from that shown or discussed, including substantially concurrent or in reverse order, depending on the functionality involved, as may be understood by those reasonably skilled in the art.

At block 802, method 800 involves receiving wind data from a wind sensor coupled to the vehicle. The wind data represents a direction and a speed of wind propagating in an environment of the vehicle. For instance, an onboard computing device may receive incoming wind data representing wind propagating in the surrounding environment in near real-time.

In some examples, the computing device may receive wind data from a plurality of wind sensors coupled to the vehicle and determine the direction and the speed of wind propagating in the environment based on the wind data from the plurality of wind sensors. For instance, the plurality of wind sensors can include a pair of wind sensors coupled to dual bull-horn style booms. Each boom may be coupled to a top portion of the tractor truck when the vehicle is a tractor truck such that the pair of wind sensors are located a threshold distance above a front surface of the tractor truck.

In some examples, the computing device may filter the wind data from the wind sensor based on a moving average. Filtering the wind data can dampen noise represented in the wind data.

In some embodiments, the sensor can be a drag device attached to the vehicle or to the environment (e.g. on a pole) with a flexible structure (or a tether). Similarly, a rotatable flag or windsock may be used as the drag device. The position of the device, influenced by the air moving around it, can provide information of the wind speed and/or direction around the vehicle or relative to the ground. In some cases, one or more cameras, radars or lidars on the autonomous vehicle can be used to detect the position of the drag device to estimate the air speed and/or direction.

At block 804, method 800 involves receiving, at the computing device, navigation data from a vehicle sensor coupled to the vehicle. The navigation data represents a direction and a speed of the vehicle. In some instances, the navigation data can further represent a rotational speed of the vehicle. For example, if the vehicle is turning, the wind sensor may detect some lateral air speed. The computing device may factor this effect in addition to the vehicle's direction and speed. As such, the navigation data may specify position (and its derivatives, like speed), and orientation (and its derivatives, like rotation speed). In particular, the computing device can use the navigation data to determine the vehicle's trajectory.

At block 806, method 800 involves estimating an ambient ground relative wind speed based on the navigation data and the wind data. In some cases, the computing device may estimate a direction of an ambient ground relative wind. The direction of the ambient ground relative wind can be relative to the direction of the vehicle.

In some examples, the computing device can determine a wind vector that depends on both the direction and the speed of wind propagating in the environment based on the wind data and also determine a vehicle trajectory vector that depends on both the direction and the speed of the vehicle based on the navigation data. The computing device may then determine a ground wind vector based on a combination of the wind vector and the vehicle trajectory vector, wherein the ground wind vector represents the ambient ground relative speed.

In some examples, the computing device may receive, from a remote computing system, a weather forecast based on a location of the vehicle. The weather forecast can indicate wind conditions for an area that includes the location of the vehicle. As such, the computing device may estimate the ambient ground relative wind speed further based on the weather forecast.

At block 808, method 800 involves adjusting behavior of the vehicle based on the ambient ground relative wind speed. In some examples, vehicle systems may adjust a direction of the vehicle based on a direction of the ground wind vector.

In some examples, the computing device may perform a comparison between the ambient ground relative wind speed and a speed threshold and cause the vehicle to decrease speed responsive to determining that the ambient ground relative wind speed exceeds or is approaching the speed threshold. For instance, the computing device may determine a speed differential between the ambient ground relative wind speed and the speed threshold. The speed differential conveys an amount that the ambient ground relative wind speed exceeds the speed threshold. The computing device may then cause the vehicle to decrease speed further based on the speed differential.

In some examples, the computing device may perform a comparison between the ambient ground relative wind speed and a predefined slowdown threshold curve. For instance, the predefined slowdown threshold curve can represent a plurality of vehicle speeds for a plurality of ambient ground relative wind speeds. For the predefined slowdown threshold curve, the plurality of vehicle speeds decrease as the plurality of ambient ground relative wind speeds increase. In some examples, the predefined slowdown threshold curve depends on a payload of the vehicle. The computing device may then adjust a speed of the vehicle based on the comparison. Similar adjustments to speed may be made for steering direction or lateral acceleration as well.

In some cases, the computing device may then detect a decrease in the ambient ground relative wind speed. Based on detecting the decrease, the computing device may then perform a comparison between the decreased ambient ground relative wind speed and a predefined resumption threshold curve. The predefined resumption threshold can represent a plurality of vehicle speeds for a plurality of ambient ground relative wind speeds with the plurality of vehicle speeds increasing as the plurality of ambient ground relative wind speeds decreases. In some instances, the predefined slowdown threshold curve depends on a payload of the vehicle. The computing device may then adjust a speed of the vehicle based on the comparison.

In some examples, the computing device may determine a crosswind speed based on the ambient ground relative wind speed and perform a comparison between the crosswind speed and a predefined slowdown threshold curve. The predefined slowdown threshold curve can represent a plurality of vehicle speeds for a plurality of crosswind speeds with the plurality of vehicle speeds decreasing as the crosswind speed increases. The predefined slowdown threshold curve can depend on the payload of the vehicle. The computing device may then adjust the speed of the vehicle based on the comparison. In some cases, the computing device may detect a decrease in the crosswind speed. Based on detecting the decrease, the computing device may then perform a comparison between the decreased crosswind speed and a predefined resumption threshold curve. The predefined resumption threshold may represent a plurality of vehicle speeds for a plurality of crosswind speeds with the plurality of vehicle speeds increasing as the crosswind speed decreases. The predefined slowdown threshold curve may depend on the payload of the vehicle. As such, the computing device may adjust the speed of the vehicle based on the comparison.

In some examples, the computing device may communicate, to a remote computing system, data representing a location of the vehicle and the ambient ground relative wind speed. The remote computing system is configured to compile a map of ambient ground relative wind speeds based on data received from a plurality of vehicles and receive the map of ambient ground relative wind speeds from the remote computing system. As such, the computing device may then adjust a path and navigation strategy of the vehicle based on the map of ambient ground relative speeds. For instance, the computing device can adjust future speeds and potentially routes based on the crosswinds indicated for different locations according to the map data.

In some examples, the computing device may use wind data to estimate a crosswind speed relative to the vehicle. The crosswind speed can be estimated based on speed and direction of air measured via the wind sensor. The crosswind speed can also be determined based on the ambient ground relative wind speed. As such, the computing device may adjust operation of the vehicle based on the crosswind speed.

Figure 9:
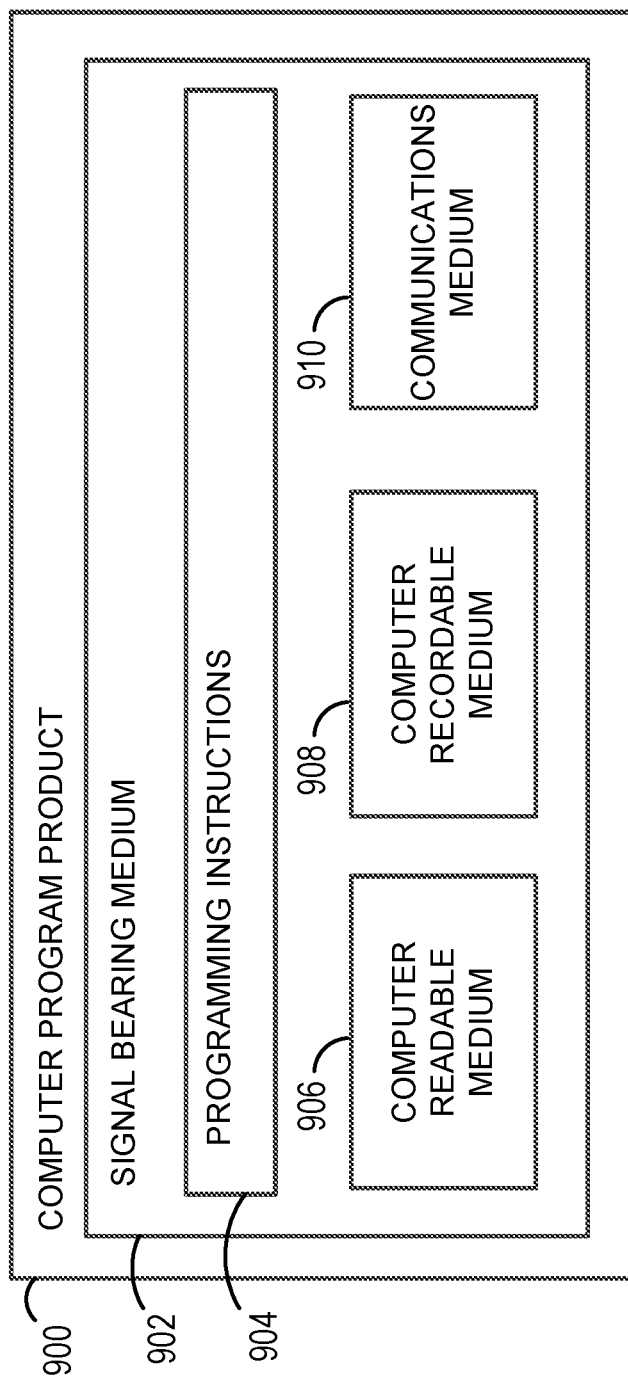
FIG. 9 is a schematic diagram of a computer program, according to one or more example embodiments.

FIG. 9 is a schematic illustrating a conceptual partial view of an example computer program product that includes a computer program for executing a computer process on a computing device, arranged according to at least some embodiments presented herein. In some embodiments, the disclosed methods may be implemented as computer program instructions encoded on a non-transitory computer-readable storage media in a machine-readable format, or on other non-transitory media or articles of manufacture.

Example computer program product 900 may be provided using signal bearing medium 902, which may include one or more programming instructions 904 that, when executed by one or more processors may provide functionality or portions of the functionality described above with respect to FIGS. 1-8. In some examples, the signal bearing medium 902 may encompass non-transitory computer-readable medium 906, such as, but not limited to, a hard disk drive, a Compact Disc (CD), a Digital Video Disk (DVD), a digital tape, memory, etc. In some implementations, the signal bearing medium 902 may encompass a computer recordable medium 908, such as, but not limited to, memory, read/write (R/W) CDs, R/W DVDs, etc. In some implementations, the signal bearing medium 902 may encompass a communications medium 910, such as, but not limited to, a digital and/or an analog communication medium (e.g., a fiber optic cable, a waveguide, a wired communications link, a wireless communication link, etc.). Thus, for example, the signal bearing medium 902 may be conveyed by a wireless form of the communications medium 910.

The one or more programming instructions 904 may be, for example, computer executable and/or logic implemented instructions. In some examples, a computing device such as the computer system 112 of FIG. 1 may be configured to provide various operations, functions, or actions in response to the programming instructions 904 conveyed to the computer system 112 by one or more of the computer readable medium 906, the computer recordable medium 908, and/or the communications medium 910.

The non-transitory computer readable medium could also be distributed among multiple data storage elements, which could be remotely located from each other. The computing device that executes some or all of the stored instructions could be a vehicle, such as vehicle 200 illustrated in FIG. 2A-2D, among other possibilities. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A method comprising:
receiving, at a computing device coupled to a vehicle, wind data from a wind sensor coupled to the vehicle, wherein the wind data represents a direction and a speed of air measured by the wind sensor as the vehicle travels a path, wherein the wind sensor is positioned on a boom that is coupled to a top portion of the vehicle, and wherein the boom has a curved structure such that the wind sensor is located a threshold distance above the vehicle;
receiving, at the computing device, navigation data from a vehicle sensor coupled to the vehicle, wherein the navigation data represents a direction and a speed of the vehicle as the vehicle travels the path;
based on the wind data, determining a wind vector that depends on both the direction and the speed of air measured by the wind sensor;
based on the navigation data, determining a vehicle trajectory vector that depends on both the direction and the speed of the vehicle;
determining a ground wind vector based on a combination of the wind vector and the vehicle trajectory vector, wherein the ground wind vector represents an ambient ground relative wind speed;
determining a crosswind speed based on the ambient ground relative wind speed; and
adjusting behavior of the vehicle using a predefined slowdown threshold curve, wherein the predefined slowdown threshold curve conveys a speed for the vehicle to use based on the crosswind speed and a payload of the vehicle.

2. The method of claim 1, wherein adjusting behavior of the vehicle comprises:
adjusting a direction of the vehicle based on a direction of the ground wind vector.

3. The method of claim 1, wherein receiving wind data comprises:
receiving wind data from a plurality of wind sensors coupled to the vehicle; and
determining the direction and the speed of air based on the wind data from the plurality of wind sensors.

4. The method of claim 3, wherein the vehicle is a tractor truck, and
wherein the plurality of wind sensors include a pair of wind sensors coupled to dual bull-horn style booms.

5. The method of claim 1, further comprising:
receiving, from a remote computing system, a weather forecast based on a location of the vehicle, wherein the weather forecast indicates wind conditions for an area that includes the location of the vehicle; and
wherein determining the ground wind vector comprises:
estimating the ambient ground relative wind speed further based on the weather forecast.

6. The method of claim 1, further comprising:
performing a comparison between the ambient ground relative wind speed and a speed threshold; and
responsive to determining that the ambient ground relative wind speed exceeds the speed threshold, causing the vehicle to decrease speed.

7. The method of claim 6, further comprising:
determining a speed differential between the ambient ground relative wind speed and the speed threshold, wherein the speed differential conveys an amount that the ambient ground relative wind speed exceeds the speed threshold; and
wherein causing the vehicle to decrease speed is further based on the speed differential.

8. The method of claim 1, wherein the predefined slowdown threshold curve represents a plurality of vehicle speeds for a plurality of crosswind speeds, and wherein the plurality of vehicle speeds decrease as the crosswind speed increases.

9. The method of claim 1, further comprising:
detecting a decrease in the crosswind speed; and
based on detecting the decrease, performing a comparison between the decreased crosswind speed and a predefined resumption threshold curve, wherein the predefined resumption threshold represents a plurality of vehicle speeds for a plurality of crosswind speeds, wherein the plurality of vehicle speeds increases as the crosswind speed decreases, and wherein the predefined slowdown threshold curve depends on a payload of the vehicle; and
wherein adjusting behavior of the vehicle comprises:
adjusting a speed of the vehicle based on the comparison.

10. The method of claim 1, further comprising:
communicating, to a remote computing system, data representing a location of the vehicle and the ambient ground relative wind speed, wherein the remote computing system is configured to compile a map of ambient ground relative wind speeds based on data received from a plurality of vehicles; and
receiving the map of ambient ground relative wind speeds from the remote computing system; and
wherein adjusting behavior of the vehicle comprises:
adjusting a path and navigation strategy of the vehicle based on the map of ambient ground relative speeds.

11. The method of claim 1, wherein determining a ground wind vector comprises:
estimating a direction of an ambient ground relative wind, wherein the direction of the ambient ground relative wind is relative to the direction of the vehicle.

12. The method of claim 1, further comprising:
filtering the wind data from the wind sensor based on a moving average, wherein filtering the wind data removes noise from the wind data.

13. The method of claim 1, wherein the wind sensor is a first wind sensor and wherein receiving wind data further comprises:
receiving wind data from the first wind sensor and a second wind sensor, wherein the second wind sensor is coupled to the vehicle.

14. The method of claim 1, wherein a position of the wind sensor on the vehicle is based on wind tunnel tests and simulations.

15. A system comprising:
a vehicle;
a computing device configured to:
receive wind data from a wind sensor coupled to the vehicle, wherein the wind data represents a direction and a speed of wind measured by the wind sensor as the vehicle travels a path, wherein the wind sensor is positioned on a boom that is coupled to a top portion of the vehicle, and wherein the boom has a curved structure such that the wind sensor is located a threshold distance above the vehicle;
receive navigation data from a vehicle sensor coupled to the vehicle, wherein the navigation data represents a direction and a speed of the vehicle as the vehicle travels the path;

based on the wind data, determine a wind vector that depends on both the direction and the speed of air measured by the wind sensor;

based on the navigation data, determine a vehicle trajectory vector that depends on both the direction and the speed of the vehicle;

determine a ground wind vector based on a combination of the wind vector and the vehicle trajectory vector, wherein the ground wind vector represents an ambient ground relative wind speed;

determine a crosswind speed based on the ambient ground relative wind speed; and adjust behavior of the vehicle using a predefined slowdown threshold curve, wherein the predefined slowdown threshold curve conveys a speed for the vehicle to use based on the crosswind speed and a payload of the vehicle.

16. The system of claim 15, wherein the vehicle is a tractor pulling a trailer.

17. The system of claim 15, wherein the wind sensor is a lidar unit.

18. The system of claim 15, wherein the wind sensor is a first wind sensor positioned on a first boom, and wherein a second wind sensor is coupled to the vehicle via a second boom.

19. The system of claim 15, wherein the vehicle is a tractor truck, and
wherein the wind sensor and a second wind sensor are coupled to dual bull-horn style booms.

20. A non-transitory computer readable medium configured to store instructions, that when executed by a computing device, causes the computing device to perform operations comprising:

receiving wind data from a wind sensor coupled to a vehicle, wherein the wind data represents a direction and a speed of wind measured by the wind sensor as the vehicle travels a path, wherein the wind sensor is positioned on a boom that is coupled to a top portion of the vehicle, and wherein the boom has a curved structure such that the wind sensor is located a threshold distance above the vehicle;

receiving navigation data from a vehicle sensor coupled to the vehicle, wherein the navigation data represents a direction and a speed of the vehicle as the vehicle travels the path;

based on the wind data, determining a wind vector that depends on both the direction and the speed of air measured by the wind sensor;

based on the navigation data, determining a vehicle trajectory vector that depends on both the direction and the speed of the vehicle;

determining a ground wind vector based on a combination of the wind vector and the vehicle trajectory vector, wherein the ground wind vector represents an ambient ground relative wind speed;

determining a crosswind speed based on the ambient ground relative wind speed; and adjusting behavior of the vehicle using a predefined slowdown threshold curve, wherein the predefined slowdown threshold curve conveys a speed for the vehicle to use based on the crosswind speed and a payload of the vehicle.

* * * * *